US010935744B2

(12) United States Patent
Coan et al.

(10) Patent No.: US 10,935,744 B2
(45) Date of Patent: Mar. 2, 2021

(54) FIBER TERMINATION ENCLOSURE WITH MODULAR PLATE ASSEMBLIES

(71) Applicant: CommScope Technologies LLC, Hickory, NC (US)

(72) Inventors: Jonathan Walter Coan, Savage, MN (US); Dennis Krampotich, Shakopee, MN (US); Jonathan R. Kaml, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/707,246

(22) Filed: Dec. 9, 2019

(65) Prior Publication Data

US 2020/0192042 A1 Jun. 18, 2020

Related U.S. Application Data

(63) Continuation of application No. 16/134,187, filed on Sep. 18, 2018, now Pat. No. 10,502,916, which is a
(Continued)

(51) Int. Cl.
*G02B 6/44* (2006.01)
*H02G 3/08* (2006.01)
*G02B 6/38* (2006.01)

(52) U.S. Cl.
CPC .......... *G02B 6/445* (2013.01); *G02B 6/3897* (2013.01); *G02B 6/4441* (2013.01);
(Continued)

(58) Field of Classification Search
None
See application file for complete search history.

(56) References Cited

U.S. PATENT DOCUMENTS

| 1,276,825 A | 8/1918 | Swope |
| 1,442,999 A | 1/1923 | Boyle |

(Continued)

FOREIGN PATENT DOCUMENTS

| CN | 1799296 A | 7/2006 |
| DE | 42 26 368 A1 | 2/1994 |

(Continued)

OTHER PUBLICATIONS

International Search Report for International Application No. PCT/US2012/043827 dated Dec. 28, 2012 (2 pages).

(Continued)

*Primary Examiner* — Michael Stahl
(74) *Attorney, Agent, or Firm* — Merchant & Gould P.C.

(57) ABSTRACT

Certain types of fiber termination enclosures include an enclosure and at least one of a plurality of plate module mounting assemblies. Example plate module mounting assemblies include a termination panel plate assembly; a splice tray plate assembly; a cable spool plate assembly; and a drop-in plate assembly. Example cable spool plate assemblies include a cable spool arrangement rotationally coupled to a mounting plate, which fixedly mounts within the enclosure housing. A stand-off mount element may be disposed on the front of the cable spool arrangement to rotate in unison with the cable spool arrangement. The stand-off mount element may include one or more termination adapters.

19 Claims, 15 Drawing Sheets

Related U.S. Application Data continuation of application No. 15/615,999, filed on Jun. 7, 2017, now Pat. No. 10,401,584, which is a continuation of application No. 15/243,143, filed on Aug. 22, 2016, now Pat. No. 9,678,293, which is a continuation of application No. 14/979,803, filed on Dec. 28, 2015, now Pat. No. 9,423,584, which is a continuation of application No. 14/127,851, filed as application No. PCT/US2012/043827 on Jun. 22, 2012, now Pat. No. 9,223,106.

(60) Provisional application No. 61/500,769, filed on Jun. 24, 2011, provisional application No. 61/500,764, filed on Jun. 24, 2011, provisional application No. 61/507,263, filed on Jul. 13, 2011, provisional application No. 61/507,270, filed on Jul. 13, 2011.

(52) U.S. Cl.
CPC ......... *G02B 6/4452* (2013.01); *G02B 6/4457* (2013.01); *G02B 6/4471* (2013.01); *G02B 6/4479* (2013.01); *H02G 3/08* (2013.01); *Y10T 29/49826* (2015.01)

(56) References Cited

U.S. PATENT DOCUMENTS

| | | |
|---|---|---|
| 1,446,410 A | 2/1923 | Bennett et al. |
| 1,474,580 A | 11/1923 | Clark et al. |
| RE20,995 E | 2/1939 | Beasley |
| 2,282,156 A | 5/1942 | Benes |
| 2,502,496 A | 4/1950 | Wickman |
| 2,521,226 A | 9/1950 | Keller |
| 2,727,703 A | 12/1955 | Bonnett |
| 2,767,426 A | 10/1956 | Grupp |
| 3,131,729 A | 5/1964 | Leysinger |
| 3,346,705 A | 10/1967 | Slinkard et al. |
| 3,433,579 A | 3/1969 | Runnion |
| 3,612,424 A | 10/1971 | Friedel |
| 3,657,491 A | 4/1972 | Ryder et al. |
| 3,667,417 A | 6/1972 | Clinkenbeard |
| 3,837,448 A | 9/1974 | Hagstrom |
| 3,920,308 A | 11/1975 | Murray |
| 3,940,086 A | 2/1976 | Stoquelet |
| 3,983,977 A | 10/1976 | Crabb |
| 4,053,118 A | 10/1977 | Aikins |
| 4,081,258 A | 3/1978 | Goell et al. |
| 4,143,746 A | 3/1979 | Lowery |
| 4,201,278 A | 5/1980 | Balde |
| 4,384,688 A | 5/1983 | Smith |
| 4,470,558 A | 9/1984 | Stamper |
| 4,520,239 A | 5/1985 | Schwartz |
| 4,587,801 A | 5/1986 | Missout et al. |
| 4,635,875 A | 1/1987 | Apple |
| 4,657,140 A | 4/1987 | Zagar et al. |
| 4,666,237 A | 5/1987 | Mallinson |
| 4,767,073 A | 8/1988 | Malzacher |
| 4,869,437 A | 9/1989 | Berz et al. |
| 4,883,337 A | 11/1989 | Dahlgren |
| 4,913,369 A | 4/1990 | Lia et al. |
| 4,939,798 A | 7/1990 | Last |
| 4,940,859 A | 7/1990 | Peterson |
| 4,953,194 A | 8/1990 | Hansen et al. |
| 4,953,810 A | 9/1990 | Stadig |
| 4,968,929 A | 11/1990 | Hauck et al. |
| 4,978,310 A | 12/1990 | Shichida |
| 5,016,554 A | 5/1991 | Harris, Jr. et al. |
| 5,052,940 A | 10/1991 | Bengal |
| 5,066,149 A | 11/1991 | Wheeler et al. |
| 5,066,256 A | 11/1991 | Ward, Sr. |
| 5,071,211 A | 12/1991 | Debortoli et al. |
| 5,074,863 A | 12/1991 | Dines |
| 5,100,221 A | 3/1992 | Carney et al. |
| 5,107,532 A | 4/1992 | Hansen et al. |
| 5,161,988 A | 11/1992 | Krupka |
| 5,166,970 A | 11/1992 | Ward |
| 5,167,001 A | 11/1992 | Debortoli et al. |
| 5,172,841 A | 12/1992 | Friedman |
| 5,185,843 A | 2/1993 | Aberson et al. |
| 5,214,730 A | 5/1993 | Nagasawa et al. |
| 5,222,164 A | 6/1993 | Bass, Sr. et al. |
| 5,246,377 A | 9/1993 | Kawahara et al. |
| 5,265,187 A | 11/1993 | Morin et al. |
| 5,265,815 A | 11/1993 | Soyka et al. |
| 5,280,861 A | 1/1994 | Corriveau |
| 5,305,405 A | 4/1994 | Emmons et al. |
| 5,310,356 A | 5/1994 | Obata et al. |
| 5,317,663 A | 5/1994 | Beard et al. |
| 5,326,040 A | 7/1994 | Kramer |
| 5,335,874 A | 8/1994 | Shrum et al. |
| 5,353,367 A | 10/1994 | Czosnowski et al. |
| 5,393,249 A | 2/1995 | Morgenstern et al. |
| 5,394,503 A | 2/1995 | Dietz, Jr. et al. |
| 5,413,494 A | 5/1995 | Dewey et al. |
| 5,418,334 A | 5/1995 | Williams |
| 5,419,717 A | 5/1995 | Abendschein et al. |
| 5,434,944 A | 7/1995 | Kerry et al. |
| 5,448,015 A | 9/1995 | Jamet et al. |
| 5,448,675 A | 9/1995 | Leone et al. |
| 5,467,062 A | 11/1995 | Burroughs et al. |
| 5,473,715 A | 12/1995 | Schofield et al. |
| 5,483,467 A | 1/1996 | Krupka et al. |
| 5,490,229 A | 2/1996 | Ghandeharizadeh et al. |
| 5,494,234 A | 2/1996 | Kramer |
| 5,494,446 A | 2/1996 | DeLucia et al. |
| 5,497,444 A | 3/1996 | Wheeler |
| 5,519,275 A | 5/1996 | Scott et al. |
| 5,522,561 A | 6/1996 | Koyamatsu et al. |
| 5,528,453 A | 6/1996 | Berman et al. |
| 5,544,836 A | 8/1996 | Pera |
| 5,551,545 A | 9/1996 | Gelfman |
| 5,613,030 A | 3/1997 | Hoffer et al. |
| 5,638,481 A | 6/1997 | Arnett |
| 5,657,412 A | 8/1997 | Caudrelier |
| 5,685,741 A | 11/1997 | Dewey et al. |
| 5,703,990 A | 12/1997 | Robertson et al. |
| 5,709,347 A | 1/1998 | Hoffmann et al. |
| 5,712,942 A | 1/1998 | Jennings et al. |
| 5,717,810 A | 2/1998 | Wheeler |
| 5,718,397 A | 2/1998 | Stevens |
| 5,734,774 A | 3/1998 | Morrell |
| 5,749,148 A | 5/1998 | White, III et al. |
| 5,773,757 A | 6/1998 | Kenney et al. |
| 5,787,219 A | 7/1998 | Mueller et al. |
| 5,821,510 A | 10/1998 | Cohen et al. |
| 5,854,824 A | 12/1998 | Bengal et al. |
| 5,915,640 A | 6/1999 | Wagter et al. |
| 5,957,401 A | 9/1999 | O'Donnell |
| 5,987,203 A | 11/1999 | Abel et al. |
| 5,987,207 A | 11/1999 | Hoke |
| 5,992,787 A | 11/1999 | Burke |
| 6,002,331 A | 12/1999 | Laor |
| 6,035,032 A | 3/2000 | Daoud |
| 6,077,108 A | 6/2000 | Lorscheider et al. |
| 6,095,837 A | 8/2000 | David et al. |
| 6,116,961 A | 9/2000 | Henneberger et al. |
| 6,135,254 A | 10/2000 | Liao |
| 6,160,946 A | 12/2000 | Thompson et al. |
| 6,176,559 B1 | 1/2001 | Tiramani et al. |
| 6,215,938 B1 | 4/2001 | Reitmeier et al. |
| 6,220,413 B1 | 4/2001 | Walters et al. |
| 6,220,762 B1 | 4/2001 | Kanai et al. |
| 6,222,908 B1 | 4/2001 | Bartolutti et al. |
| 6,222,975 B1 | 4/2001 | Gilbert et al. |
| 6,223,675 B1 | 5/2001 | Watt et al. |
| 6,234,830 B1 | 5/2001 | Ensz et al. |
| 6,238,235 B1 | 5/2001 | Shavit et al. |
| 6,285,293 B1 | 9/2001 | German et al. |
| 6,286,777 B1 | 9/2001 | Black |
| 6,300,877 B1 | 10/2001 | Schannach et al. |
| 6,315,598 B1 | 11/2001 | Elliot et al. |
| 6,330,148 B1 | 12/2001 | Won et al. |
| 6,330,307 B1 | 12/2001 | Bloch et al. |

(56) References Cited

U.S. PATENT DOCUMENTS

| | | | |
|---|---|---|---|
| 6,349,893 B1 | 2/2002 | Daoud |
| 6,350,148 B1 | 2/2002 | Bartolutti et al. |
| 6,361,360 B1 | 3/2002 | Hwang et al. |
| 6,367,347 B1 | 4/2002 | Blaschke et al. |
| 6,419,175 B1 | 7/2002 | Rankin, VI |
| 6,421,322 B1 | 7/2002 | Koziy et al. |
| 6,424,710 B1 | 7/2002 | Bartolutti et al. |
| 6,433,274 B1 | 8/2002 | Doss et al. |
| 6,456,768 B1 | 9/2002 | Boncek et al. |
| D466,479 S | 12/2002 | Pein et al. |
| 6,494,396 B2 | 12/2002 | Sugata |
| 6,499,861 B1 | 12/2002 | German et al. |
| 6,511,009 B1 | 1/2003 | Harrison et al. |
| 6,511,231 B2 | 1/2003 | Lampert et al. |
| 6,522,737 B1 | 2/2003 | Bartolutti et al. |
| 6,522,826 B2 | 2/2003 | Gregory |
| 6,533,216 B1 | 3/2003 | Bumgarner et al. |
| 6,554,221 B2 | 4/2003 | Hinds |
| 6,554,484 B2 | 4/2003 | Lampert |
| 6,574,586 B1 | 6/2003 | David et al. |
| 6,591,051 B2 | 7/2003 | Solheid et al. |
| 6,616,080 B1 | 9/2003 | Edwards et al. |
| 6,626,697 B1 | 9/2003 | Martin et al. |
| 6,636,152 B2 | 10/2003 | Schannach et al. |
| 6,643,443 B2 | 11/2003 | Holman et al. |
| 6,648,520 B2 | 11/2003 | McDonald et al. |
| 6,669,129 B1 | 12/2003 | Shah |
| 6,684,179 B1 | 1/2004 | David |
| 6,711,339 B2 | 3/2004 | Puetz et al. |
| 6,715,619 B2 | 4/2004 | Kim et al. |
| 6,721,484 B1 | 4/2004 | Blankenship et al. |
| 6,725,177 B2 | 4/2004 | David et al. |
| 6,743,044 B2 | 6/2004 | Musolf et al. |
| 6,745,971 B1 | 6/2004 | Renzoni |
| 6,758,314 B2 | 7/2004 | Woodruff |
| 6,760,530 B1 | 7/2004 | Mandry |
| 6,793,408 B2 | 9/2004 | Levy et al. |
| 6,802,735 B2 | 10/2004 | Pepe et al. |
| 6,808,116 B1 | 10/2004 | Eslambolchi et al. |
| 6,814,624 B2 | 11/2004 | Clark et al. |
| 6,819,854 B1 | 11/2004 | Young et al. |
| 6,834,517 B1 | 12/2004 | Sheehy, Jr. |
| 6,845,207 B2 | 1/2005 | Schray |
| 6,850,685 B2 | 2/2005 | Tinucci et al. |
| 6,856,748 B1 | 2/2005 | Elkins, II et al. |
| 6,885,799 B2 | 4/2005 | Lee |
| 6,898,368 B2 | 5/2005 | Colombo et al. |
| 6,901,200 B2 | 5/2005 | Schray |
| 6,905,363 B2 | 6/2005 | Musolf et al. |
| 6,915,058 B2 | 7/2005 | Pons |
| 6,932,517 B2 | 8/2005 | Swayze et al. |
| 6,933,441 B2 | 8/2005 | Fuller et al. |
| 6,937,725 B2 | 8/2005 | Liao |
| D510,068 S | 9/2005 | Haggay et al. |
| 6,944,387 B2 | 9/2005 | Howell et al. |
| 6,948,680 B2 | 9/2005 | Ganster |
| 6,961,675 B2 | 11/2005 | David |
| 6,971,895 B2 | 12/2005 | Sago et al. |
| 6,976,867 B2 | 12/2005 | Navarro et al. |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,027,704 B2 | 4/2006 | Frohlich et al. |
| 7,036,601 B2 | 5/2006 | Berg et al. |
| 7,050,041 B1 | 5/2006 | Smith et al. |
| 7,052,281 B1 | 5/2006 | Meyberg et al. |
| 7,077,710 B2 | 7/2006 | Haggay et al. |
| 7,081,808 B2 | 7/2006 | Colombo et al. |
| 7,112,090 B2 | 9/2006 | Caveney et al. |
| 7,123,810 B2 | 10/2006 | Parrish |
| 7,139,461 B2 | 11/2006 | Puetz et al. |
| 7,142,764 B2 | 11/2006 | Allen et al. |
| 7,153,142 B2 | 12/2006 | Shifris et al. |
| 7,165,728 B2 | 1/2007 | Durrant et al. |
| 7,193,422 B2 | 3/2007 | Velleca et al. |
| 7,210,858 B2 | 5/2007 | Sago et al. |
| 7,220,144 B1 | 5/2007 | Elliot et al. |
| 7,226,217 B1 | 6/2007 | Benton et al. |
| 7,234,944 B2 | 6/2007 | Nordin et al. |
| 7,292,763 B2 | 11/2007 | Smith et al. |
| 7,297,018 B2 | 11/2007 | Caveney et al. |
| 7,298,952 B2 | 11/2007 | Allen et al. |
| 7,306,101 B2 | 12/2007 | Murry |
| 7,312,715 B2 | 12/2007 | Shalts et al. |
| D559,186 S | 1/2008 | Kelmer |
| 7,315,224 B2 | 1/2008 | Gurovich et al. |
| 7,315,681 B2 | 1/2008 | Kewitsch |
| 7,346,253 B2 | 3/2008 | Bloodsworth et al. |
| 7,352,289 B1 | 4/2008 | Harris |
| 7,364,108 B2 | 4/2008 | Kim et al. |
| 7,369,739 B2 | 5/2008 | Kline et al. |
| 7,370,106 B2 | 5/2008 | Caveney |
| 7,397,997 B2 | 7/2008 | Ferris et al. |
| 7,400,814 B1 | 7/2008 | Hendrickson et al. |
| 7,406,242 B1 | 7/2008 | Braga |
| 7,416,349 B2 | 8/2008 | Kramer |
| 7,477,829 B2 | 1/2009 | Kaplan |
| 7,479,032 B2 | 1/2009 | Hoath et al. |
| 7,512,304 B2 | 3/2009 | Gronvall et al. |
| 7,519,000 B2 | 4/2009 | Caveney et al. |
| 7,522,806 B2 | 4/2009 | Hendrickson et al. |
| 7,533,841 B1 | 5/2009 | Harrison et al. |
| 7,534,137 B2 | 5/2009 | Caveney et al. |
| 7,546,018 B2 | 6/2009 | Hendrickson et al. |
| 7,552,872 B2 | 6/2009 | Tokita et al. |
| 7,570,861 B2 | 8/2009 | Smrha et al. |
| 7,591,667 B2 | 9/2009 | Gatnau Navarro et al. |
| 7,676,136 B2 | 3/2010 | Wakileh et al. |
| 7,697,811 B2 | 4/2010 | Murano et al. |
| 7,711,233 B2 | 5/2010 | Mahoney |
| 7,715,679 B2 | 5/2010 | Kowalczyk et al. |
| 7,748,660 B2 | 7/2010 | Hendrickson et al. |
| 7,751,672 B2 | 7/2010 | Smith et al. |
| 7,756,379 B2 | 7/2010 | Kowalczyk et al. |
| 7,809,234 B2 | 10/2010 | Smith et al. |
| 7,811,119 B2 | 10/2010 | Caveney et al. |
| 7,869,426 B2 | 1/2011 | Hough et al. |
| 7,869,682 B2 | 1/2011 | Kowalczyk et al. |
| 7,872,738 B2 | 1/2011 | Abbott |
| 7,885,505 B2 | 2/2011 | Zimmel |
| 7,894,701 B2 | 2/2011 | Kowalczyk et al. |
| 8,081,857 B2 | 12/2011 | Nair et al. |
| 8,131,126 B2 | 3/2012 | Kowalczyk et al. |
| 8,157,582 B2 | 4/2012 | Frey et al. |
| 8,189,984 B2 | 5/2012 | Kowalczyk et al. |
| 8,229,267 B2 | 7/2012 | Kowalczyk et al. |
| 8,254,740 B2 | 8/2012 | Smith et al. |
| 8,265,447 B2 | 9/2012 | Loeffelholz et al. |
| 8,326,107 B2 | 12/2012 | Cooke et al. |
| 8,380,035 B2 | 2/2013 | Kowalczyk et al. |
| 8,422,847 B2 | 4/2013 | Kowalczyk et al. |
| 8,437,596 B2 | 5/2013 | Nair et al. |
| 8,494,333 B2 | 7/2013 | Kowalczyk et al. |
| 8,494,334 B2 | 7/2013 | Kowalczyk et al. |
| 8,565,572 B2 | 10/2013 | Krampotich et al. |
| 8,705,929 B2 | 4/2014 | Kowalczyk et al. |
| 8,774,588 B2 | 7/2014 | Kowalczyk et al. |
| RE45,153 E | 9/2014 | Hendrickson et al. |
| 8,891,931 B2 | 11/2014 | Kowalczyk et al. |
| 8,929,706 B2 | 1/2015 | Teymouri |
| 8,938,147 B2 | 1/2015 | Krampotich et al. |
| 9,042,700 B2 | 5/2015 | Smith et al. |
| 9,057,860 B2 | 6/2015 | Kowalczyk et al. |
| 9,078,287 B2 * | 7/2015 | Khemakhem ........ G02B 6/4249 |
| 9,106,981 B2 * | 8/2015 | Vastmans .............. G02B 6/4292 |
| 9,170,392 B2 | 10/2015 | Krampotich et al. |
| 9,223,106 B2 | 12/2015 | Coan et al. |
| 9,261,663 B2 | 2/2016 | Loeffelholz et al. |
| 9,261,666 B2 | 2/2016 | Kowalczyk et al. |
| 9,341,802 B2 | 5/2016 | Krampotich et al. |
| 9,423,584 B2 | 8/2016 | Coan et al. |
| 9,606,319 B2 | 3/2017 | Kowalczyk et al. |

(56) References Cited

U.S. PATENT DOCUMENTS

| | | |
|---|---|---|
| 9,678,293 B2 | 6/2017 | Coan et al. |
| 2001/0019002 A1 | 9/2001 | Walters et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0023984 A1 | 2/2002 | Oppmann et al. |
| 2002/0083538 A1 | 7/2002 | Silverman et al. |
| 2002/0126980 A1 | 9/2002 | Holman et al. |
| 2002/0164121 A1 | 11/2002 | Brennan, III et al. |
| 2002/0171002 A1 | 11/2002 | Krestsch et al. |
| 2003/0037480 A1 | 2/2003 | Davis |
| 2003/0042348 A1 | 3/2003 | Salentine et al. |
| 2003/0142817 A1 | 7/2003 | Liao |
| 2003/0230667 A1 | 12/2003 | Ganster |
| 2004/0052498 A1 | 3/2004 | Colombo et al. |
| 2004/0065443 A1 | 4/2004 | Berg et al. |
| 2004/0084271 A1 | 5/2004 | Woodruff |
| 2004/0170369 A1 | 9/2004 | Pons |
| 2004/0200332 A1 | 10/2004 | Chen |
| 2004/0209505 A1 | 10/2004 | Wade et al. |
| 2004/0240807 A1 | 12/2004 | Frohlich et al. |
| 2004/0244430 A1 | 12/2004 | Sheehy, Jr. |
| 2004/0258384 A1 | 12/2004 | Trebesch et al. |
| 2005/0062881 A1 | 3/2005 | Caci et al. |
| 2005/0103515 A1 | 5/2005 | Fuller et al. |
| 2005/0128769 A1 | 6/2005 | Gozum et al. |
| 2005/0145522 A1 | 7/2005 | Bloodworth et al. |
| 2005/0184186 A1 | 8/2005 | Tsoi et al. |
| 2005/0185910 A1 | 8/2005 | Zimmel |
| 2005/0213920 A1 | 9/2005 | Tanaka et al. |
| 2005/0247136 A1 | 11/2005 | Cross et al. |
| 2005/0258203 A1 | 11/2005 | Weaver |
| 2005/0258411 A1 | 11/2005 | Zeitler |
| 2006/0028198 A1 | 2/2006 | Hoopengarner |
| 2006/0045458 A1 | 3/2006 | Sasaki et al. |
| 2006/0054760 A1 | 3/2006 | Murry |
| 2006/0148279 A1 | 7/2006 | German et al. |
| 2006/0160395 A1 | 7/2006 | Macauley et al. |
| 2006/0163403 A1 | 7/2006 | Dickson |
| 2006/0169856 A1 | 8/2006 | Dorenkamp et al. |
| 2006/0183362 A1 | 8/2006 | Mullaney et al. |
| 2006/0185953 A1 | 8/2006 | Gieseke |
| 2006/0186255 A1 | 8/2006 | Rooker |
| 2006/0187696 A1 | 8/2006 | Lanni |
| 2006/0210230 A1 | 9/2006 | Kline et al. |
| 2006/0231672 A1 | 10/2006 | Eastwood et al. |
| 2006/0264094 A1 | 11/2006 | Young |
| 2006/0266605 A1 | 11/2006 | Caamano et al. |
| 2006/0280418 A1 | 12/2006 | Mahoney |
| 2007/0023559 A1 | 2/2007 | Scapillato et al. |
| 2007/0025675 A1 | 2/2007 | Kramer |
| 2007/0036506 A1 | 2/2007 | Kewitsch |
| 2007/0096538 A1 | 5/2007 | Niemi et al. |
| 2007/0108333 A1 | 5/2007 | Kuramoto |
| 2007/0165995 A1 | 7/2007 | Reagan et al. |
| 2007/0176045 A1 | 8/2007 | Chen |
| 2007/0189691 A1 | 8/2007 | Barth et al. |
| 2007/0237470 A1 | 10/2007 | Aronson et al. |
| 2008/0008436 A1 | 1/2008 | Reagan et al. |
| 2008/0011990 A1 | 1/2008 | Kostet et al. |
| 2008/0013893 A1 | 1/2008 | Zheng et al. |
| 2008/0013909 A1 | 1/2008 | Kostet et al. |
| 2008/0035778 A1 | 2/2008 | Belden et al. |
| 2008/0037945 A1 | 2/2008 | Gniadek et al. |
| 2008/0093187 A1 | 4/2008 | Roberts et al. |
| 2008/0100467 A1 | 5/2008 | Downie et al. |
| 2008/0116312 A1 | 5/2008 | Eastwood et al. |
| 2008/0131132 A1* | 6/2008 | Solheid ............... G02B 6/4441 398/117 |
| 2008/0145013 A1 | 6/2008 | Escoto et al. |
| 2008/0170831 A1 | 7/2008 | Hendrickson et al. |
| 2008/0011514 A1 | 8/2008 | Zheng et al. |
| 2008/0199139 A1 | 8/2008 | Henderson |
| 2008/0218947 A1 | 9/2008 | Atkinson |
| 2008/0236209 A1 | 10/2008 | Conti et al. |
| 2008/0292261 A1 | 11/2008 | Kowalczyk et al. |
| 2008/0315030 A1 | 12/2008 | Hendrickson et al. |
| 2009/0057085 A1 | 3/2009 | Caamano et al. |
| 2009/0060441 A1 | 3/2009 | Kowalczyk et al. |
| 2009/0074370 A1* | 3/2009 | Kowalczyk ......... G02B 6/4441 385/135 |
| 2009/0097846 A1 | 4/2009 | Kozischek et al. |
| 2009/0098763 A1 | 4/2009 | Below et al. |
| 2009/0166404 A1 | 7/2009 | German et al. |
| 2009/0190894 A1 | 7/2009 | Nhep et al. |
| 2009/0215310 A1 | 8/2009 | Hoath et al. |
| 2009/0257726 A1 | 10/2009 | Redmann et al. |
| 2009/0317047 A1 | 12/2009 | Smith et al. |
| 2010/0054680 A1 | 3/2010 | Lochkovic et al. |
| 2010/0054682 A1 | 3/2010 | Cooke |
| 2010/0054684 A1 | 3/2010 | Cooke et al. |
| 2010/0074587 A1 | 3/2010 | Loeffelholz et al. |
| 2010/0090830 A1 | 4/2010 | Conti et al. |
| 2010/0166376 A1 | 7/2010 | Nair et al. |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0322583 A1 | 12/2010 | Cooke et al. |
| 2011/0024544 A1 | 2/2011 | Smrha et al. |
| 2011/0044599 A1 | 2/2011 | Kowalczyk et al. |
| 2011/0092100 A1 | 4/2011 | Coffey et al. |
| 2011/0094274 A1 | 4/2011 | Conti et al. |
| 2011/0103761 A1 | 5/2011 | LeBlanc et al. |
| 2011/0158598 A1 | 6/2011 | LeBlanc et al. |
| 2011/0222829 A1 | 9/2011 | Loeffelholz et al. |
| 2011/0242735 A1* | 10/2011 | Landry .................... H05K 7/16 361/622 |
| 2011/0317974 A1 | 12/2011 | Krampotich et al. |
| 2012/0063735 A1 | 3/2012 | Nair et al. |
| 2012/0230644 A1 | 9/2012 | Marmon et al. |
| 2013/0094828 A1 | 4/2013 | Loeffelholz et al. |
| 2013/0129295 A1 | 5/2013 | Arakkakudy et al. |
| 2013/0170810 A1 | 7/2013 | Badar et al. |
| 2013/0170811 A1 | 7/2013 | Kowalczyk et al. |
| 2013/0242866 A1 | 9/2013 | Lin et al. |
| 2014/0010512 A1 | 1/2014 | Kowalczyk et al. |
| 2014/0010513 A1 | 1/2014 | Kowalczyk et al. |
| 2014/0376871 A1 | 12/2014 | Kowalczyk et al. |
| 2015/0063770 A1 | 3/2015 | Kowalczyk et al. |
| 2015/0093088 A1 | 4/2015 | Matz et al. |
| 2015/0177472 A1 | 6/2015 | Kowalczyk et al. |
| 2017/0199344 A1 | 7/2017 | Kowalczyk et al. |
| 2017/0336587 A1 | 11/2017 | Coan et al. |

FOREIGN PATENT DOCUMENTS

| | | |
|---|---|---|
| DE | 102 44 304 B3 | 3/2004 |
| EP | 1 107 031 A1 | 6/2001 |
| EP | 2 618 195 A2 | 7/2013 |
| FR | 2 566 997 A1 | 1/1986 |
| GB | 2 236 398 A | 4/1991 |
| JP | 1-123203 A | 5/1989 |
| JP | 9-236709 | 9/1997 |
| JP | 11-87006 A | 3/1999 |
| JP | 11-349230 | 12/1999 |
| JP | 2003-114339 | 4/2003 |
| JP | 2005-73365 | 3/2005 |
| JP | 2005-249858 | 9/2005 |
| JP | 2007-121609 | 5/2007 |
| WO | WO 2009/048680 A1 | 4/2009 |
| WO | WO 2010/001400 A1 | 1/2010 |
| WO | WO 2010/081186 A1 | 7/2010 |
| WO | WO 2010/121639 A1 | 10/2010 |

OTHER PUBLICATIONS

Opterna AM's MultiOpt® line of FTTX products, Product Index, Opertna AM, Inc., 16 pages (Copyright 2011).

Complaint, *CommScope Technologies LLC v. Clearfield, Inc.*, Case No. 0:17-cv-00307, 77 pages (Jan. 31, 2017).

Complaint Exhibit G, *CommScope Technologies LLC v. Clearfield, Inc.*, Case No. 0:17-cv-00307- PJS-BRT, 3 pages (Jan. 31, 2017).

(56) References Cited

OTHER PUBLICATIONS

Complaint Exhibit H, *CommScope Technologies LLC* v. *Clearfield, Inc.*, Case No. 0:17-cv-00307-PJS-BRT, 3 pages (Jan. 31, 2017).
Answer, *CommScope Technologies LLC* v. *Clearfield, Inc.*, Case No. 0:17-cv-00307-PJS-BRT, 27 pages (Apr. 24, 2017).
Defendant Clearfield Inc.'s Preliminary Invalidity Claim Charts and Disclosures, *CommScope Technologies LLC* v. *Clearfield, Inc.*, Case No. 0:17-cv-00307-PJS-BRT, 62 pages (Oct. 6, 2017).
Defendant Clearfield Inc.'s Invalidity Claim Chart Exhibit 10, *CommScope Technologies LLC* v. *Clearfield, Inc.*, Case No. 0:17-cv-00307-PJS-BRT, 36 pages (Oct. 6, 2017).
Defendant Clearfield Inc.'s Invalidity Claim Chart Exhibit 11, *CommScope Technologies LLC* v. *Clearfield, Inc.*, Case No. 0:17-cv-00307-PJS-BRT, 60 pages (Oct. 6, 2017).
Defendant Clearfield Inc.'s Invalidity Claim Chart Table D, *CommScope Technologies LLC* v. *Clearfield, Inc.*, Case No. 0:17-cv-00307-PJS-BRT, 7 pages (Oct. 6, 2017).
Defendant Clearfield Inc.'s Invalidity Claim Chart Table E, *CommScope Technologies LLC* v. *Clearfield, Inc.*, Case No. 0:17-cv-00307-PJS-BRT, 7 pages (Oct. 6, 2017).
Plaintiff CommScope's Initial Claim Charts including Exhibits J and K, *CommScope Technologies LLC* v. *Clearfield, Inc.*, Case No. 0:17-cv-00307-PJS-BRT, 28 pages (Oct. 9, 2017).
Plaintiff CommScope Technologies LLC's Response to Defendant's First Set of Interrogatories to Plaintiff (Nos. 1-15), *CommScope Technologies LLC* v. *Clearfield, Inc.*, Case No. 0:17-cv-00307-PJS-BRT, 26 pages (Oct. 9, 2017).
Plaintiff CommScope Technologies LLC's Supplemental Response to Defendant's Interrogatory No. 2, *CommScope Technologies LLC* v. *Clearfield, Inc.*, Case No. 0:17-cv-00307-PJS-BRT, 5 pages (Oct. 9, 2017).
Plaintiff CommScope Technologies LLC's Memorandum in Support of Motion to Compel Discovery, *CommScope Technologies LLC* v. *Clearfield, Inc.*, Case No. 0:17-cv-00307-PJS-BRT, 21 pages (Oct. 9, 2017).
Petition for Inter Partes Review of U.S. Pat. No. 8,705,929, *Clearfield Inc.* v. *CommScope Technologies LLC*, Case No. IPR2017-02122, 67 pages (Sep. 15, 2017).
Inter Partes Review Case No. IPR2017-02122, Ex. 1003—Declaration of Dr. Michael Lebby, 141 pages (Sep. 15, 2017).
Inter Partes Review Case No. IPR2017-02122, Ex. 1007—Prosecution History of U.S. Appl. No. 12/182,705, filed Jul. 30, 2008., 332 pages.
Inter Partes Review Case No. IPR2017-02122, Ex. 1008—PCT Patent No. WO 2009/048680 A1.
Inter Partes Review Case No. IPR2017-02122, Ex. 1009—European Patent No. 2 618 195 A2.
Inter Partes Review Case No. IPR2017-02122, Ex. 1010—EP App. No. 13163032.9.
Inter Partes Review Case No. IPR2017-02122, Ex. 1011—U.S. Pat. No. 4,657,140.
Inter Partes Review Case No. IPR2017-02122, Ex. 1012—USConec MTP® Brand Connectors Data Sheet (© 2014), 2 pages.
Inter Partes Review Case No. IPR2017-02122, Ex. 1013—Katsuki Suematsu et al., "Super Low-Loss, Super High-Density Multi-Fiber Optical Connectors," Furukawa Review (n. 23), 2003 (*"Suematsu"*).
Australian Office Action (Appln. No. 2008247361), dated Nov. 8, 2013.
Complaint relating to Civil Action No. 1:11cv-735 (GBL-IDD), *ADC Telecommunications, Inc* v. *Opterna Am, Inc.* filed Jul. 12, 2011 (5 pages).
Complaint relating to Civil Action No. 5:11-cv-02509-JS, *ADC Telecommunications, Inc* v. *Opterna Am, Inc.* filed Apr. 11, 2011 (14 pages).
Description of Admitted Prior Art, 30 pages.
European Search Report for Application No. 13163032.9 dated Jul. 4, 2013.
European Search Report for Application No. 15182271.5 dated Dec. 2, 2015.

F3DF Modules, ADC Telecommunications, Inc. © 1995, "Individual 12-Pack Assemblies", pp. 90.
Fiber Cable Management Products, Third Edition, ADC Telecommunications, Inc., © 1995, 1998.
Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
International Search Report and Written Opinion for PCT/US2008/062764 dated Aug. 8, 2008.
International Search Report and Written Opinion for PCT/US2008/075196 dated Nov. 18, 2008.
International Search Report and Written Opinion for PCT/US2008/072218 dated Mar. 18, 2009.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Preliminary Response by Patent Owner Under 37 C.F.R. § 42.107, Case IPR2017-02122, Paper No. 6, 71 pages (Dec. 22, 2017).
Ex. 2001—Declaration of Casimer DeCusatis in Support of Patent Owner's Preliminary Response, Case IPR2017-02122.
Ex. 2002—Office Action dated Jun. 19, 2009 in connection with U.S. Appl. No. 12/182,705.
Ex. 2003—Response to Jun. 19, 2009 Office Action in connection with U.S. Appl. No. 12/182,705.
Ex. 2004—U.S. Patent Application Publication No. 2006/021 0230 ("Kline").
Ex. 2005—Excerpts from the Merriam-Webster's Collegiate Dictionary (Tenth Edition) (2000).
Ex. 2006—Excerpts from the New Oxford American Dictionary (Third Edition) (2010).
7 Inch Modules, ADC Telecommunications, Inc, © 1998, "7 Inch Connector Module with IFC", pp. 127.
Australian Examination Report for Application No. 2015205930; dated Jul. 13, 2016; 4 pages.
*Avaya's Enhanced SYSTIM® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.
*Intelligent patching systems carving out a 'large' niche*, Cabling Installation & Maintenance, vol. 12, Issue 7, Jul. 2004 (5 pages).
*IntelliMAC: The intelligent way to make Moves, Adds or Changes!* NORDX/CDT © 2003 (6 pages).
International Search Report and Written Opinion for PCT/US2010/052872 dated Jan. 12, 2011.
International Search Report and Written Opinion for PCT/US2011/041605 dated Feb. 24, 2012.
Meredith, L., "Managers missing point of intelligent patching," *Daa Center News*, Jun. 21, 2005, obtained Dec. 2, 2008 from http://searchdatacenter.techtarget.com/news/article/0,289142,sid80_gcil099991,00.html.
Notice of Allowance for U.S. Appl. No. 13/924,191 dated Dec. 3, 2013.

(56) References Cited

OTHER PUBLICATIONS

Ohtsuki, F. et al., "Design of Optical Connectors with ID Modules," *Electronics and Communications in Japan*, Part 1, vol. 77, No. 2, pp. 94-105 (Feb. 1994).
Supplemental Notice of Allowability for U.S. Appl. No. 13/924,191 dated Mar. 10, 2014.
Supplemental Notice of Allowability for U.S. Appl. No. 13/924,191 dated Mar. 14, 2014.
*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet; May 2008; 8 pages.
Value-Added Module System, ADC Telecommunications, Inc., © 1993, 1194, 1998, "12-Pack Module Assemblies", pp. 30-31.
Plaintiff's Notice of Dismissal relating to Civil Action No. 5:11-cv-02509-JS, *ADC Telecommunications, Inc v. Opterna Am, Inc.* filed Jul. 12, 2011 (1 page).
Defendant Clearfield Inc.'s Revised Preliminary Invalidity Claim Charts and Disclosures, Civil Action No. 17-cv-00307-PJS-BRT, 51 pages (Dec. 11, 2017).
Defendant Clearfield Inc.'s Revised Invalidity Claim Chart Exhibit 10, *CommScope Technologies LLC v. Clearfield, Inc.*, Case No. 0:17-cv-00307-PJS-BRT, 38 pages (Dec. 11, 2017).
Defendant Clearfield Inc.'s Revised Invalidity Claim Chart Exhibit 11, *CommScope Technologies LLC v. Clearfield, Inc.*, Case No. 0:17-cv-00307-PJS-BRT, 39 pages (Dec. 11, 2017).
Defendant Clearfield Inc.'s Revised Invalidity Claim Chart Table D, *CommScope Technologies LLC v. Clearfield, Inc.*, Case No. 0:17-cv-00307-PJS-BRT, 7 pages (Dec. 11, 2017).
Defendant Clearfield Inc.'s Revised Invalidity Claim Chart Table E, *CommScope Technologies LLC v. Clearfield, Inc.*, Case No. 0:17-cv-00307-PJS-BRT, 6 pages (Dec. 11, 2017).
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 10 to Second Revised Preliminary Invalidity Claim Charts and Disclosures, Civil Action No. 17-cv-00307-PJS-BRT, 43 pages (Jan. 12, 2018).
Exhibit 11 to Second Revised Preliminary Invalidity Claim Charts and Disclosures, Civil Action No. 17-cv-00307-PJS-BRT, 47 pages (Jan. 12, 2018).
Commscope's Response to Clearfield's Second Revised Invalidity Claim Charts and Disclosure, Civil Action No. 17-cv-00307-PJS-BRT, 105 pages (Jan. 19, 2018).
Exhibit J to Second Revised Preliminary Invalidity Claim Charts and Disclosures, Civil Action No. 17-cv-00307-PJS-BRT, 21 pages (Jan. 19, 2018).
Exhibit K to Second Revised Preliminary Invalidity Claim Charts and Disclosures, Civil Action No. 17-cv-00307-PJS-BRT, 19 pages (Jan. 19, 2018).
Joint Status Report, *CommScope Technologies LLC v. Clearfield, Inc.*, Case No. 0:17-cv-00307-PJS-BRT, 11 pages (Feb. 9, 2018.
Joint Status Report Exhibit A, *CommScope Technologies LLC v. Clearfield, Inc.*, Case No. 0:17-cv-00307-PJS-BRT, 33 pages (Feb. 9, 2018).
Joint Status Report Exhibit B, *CommScope Technologies LLC v. Clearfield, Inc.*, Case No. 0:17-cv-00307-PJS-BRT, 21 pages (Feb. 9, 2018).
Stipulation of Dismissal, *CommScope Technologies LLC v. Clearfield, Inc.*, Case No. 0:17-cv-00307-PJS-BRT, 2 pages (Feb. 19, 2018).
Order of Dismissal, *CommScope Technologies LLC v. Clearfield, Inc.*, Case No. 0:17-cv-00307-PJS-BRT, 1 page (Feb. 20, 2018).
Inter Partes Review Case No. IPR2017-02122, Ex. 1004—U.S. Pat. No. 6,220,413 B1.
Inter Partes Review Case No. IPR2017-02122, Ex. 1005—U.S. Pat. No. 6,933,441 B2.
Inter Partes Review Case No. IPR2017-02122, Ex. 1006—U.S. Pat. No. 4,201,278.
Inter Partes Review Case No. IPR2017-02122, Ex. 1014—U.S. Pat. No. 6,885,799 B2.

\* cited by examiner

FIBER TERMINATION ENCLOSURE WITH MODULAR PLATE ASSEMBLIES

CROSS-REFERENCE TO RELATED APPLICATIONS

This application is a continuation of U.S. application Ser. No. 16/134,187, filed Sep. 18, 2018, now U.S. Pat. No. 10,502,916, which is a continuation of U.S. application Ser. No. 15/615,999, filed Jun. 7, 2017, now U.S. Pat. No. 10,401,584, which is a continuation of U.S. application Ser. No. 15/243,143, filed Aug. 22, 2016, now U.S. Pat. No. 9,678,293, which is a continuation of U.S. application Ser. No. 14/979,803, filed Dec. 28, 2015, now U.S. Pat. No. 9,423,584, which is a continuation of U.S. application Ser. No. 14/127,851, filed Feb. 12, 2014, now U.S. Pat. No. 9,223,106, which is a National Stage of PCT/US2012/043827, filed Jun. 22, 2012, which claims the benefit of U.S. Application Nos. 61/500,769, filed Jun. 24, 2011, and titled "Fiber Termination Enclosure with Internal Cable Spool Assembly;" 61/500,764, filed Jun. 24, 2011, and titled "Fiber Termination Enclosure with Modular Plate Assemblies;" 61/507,263, filed Jul. 13, 2011, and titled "Fiber Termination Enclosure with Internal Cable Spool Assembly," and 61/507,270, filed Jul. 13, 2011, and titled "Fiber Termination Enclosure with Modular Plate Assemblies;" the disclosures of which are hereby incorporated herein by reference.

TECHNICAL FIELD

The present disclosure relates to fiber optic enclosure, and more particularly, to a fiber optic enclosure with cable payout.

BACKGROUND

As demand for the telecommunication services increases, fiber optic networks are being extended in more and more areas (e.g., multiple dwelling units, apartments, condominiums, businesses, distributed antenna systems, cell towers, rural areas, single family residences). This growth has been particularly notable in the area of wireless communications, e.g., cellular, personal communication services (PCS) and other mobile radio systems. To efficiently distribute fiber optic services to these various different subscribers, system design flexibility is significant. System design flexibility can include the ability to efficiently provide different varying fiber optic cable lengths and the ability to efficiently provide fiber optic enclosures having interior components customized to meet a given customer's needs.

SUMMARY

An aspect of the present disclosure relates to a fiber optic enclosure assembly. The fiber optic enclosure includes an enclosure housing that is adapted to optically connect incoming fibers to outgoing fibers. One or more modular plate assemblies may be mounted within an interior of the enclosure to customize the fiber optic enclosure.

In accordance with some aspects of the disclosure, certain types of modular plate assemblies include termination adapter arrangements. In accordance with some aspects of the disclosure, certain types of modular plate assemblies include splice trays arrangements. In accordance with some aspects of the disclosure, certain types of modular plate assemblies include cable spool arrangements.

In accordance with some aspects of the disclosure, modular cable port arrangements may be disposed at the enclosure housing. In some implementations, various types of modular cable port arrangements can be selectively mounted at the enclosure housing.

In accordance with certain aspects of the disclosure, a cable spool arrangement is connected to an interior of the enclosure to rotate relative to the enclosure. One or more fiber cables may be paid out from the enclosure by pulling one end of the fiber cable through a cable port to unwind the fiber cable from the cable spool arrangement. In certain implementations, one or more adapters may be disposed on the cable spool arrangement to rotate in unison with the cable spool arrangement. In certain implementations, the termination adapters are disposed on a stand-off mount element that is spaced from the cable spool arrangement, but configured to rotate in unison with the cable spool arrangement.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
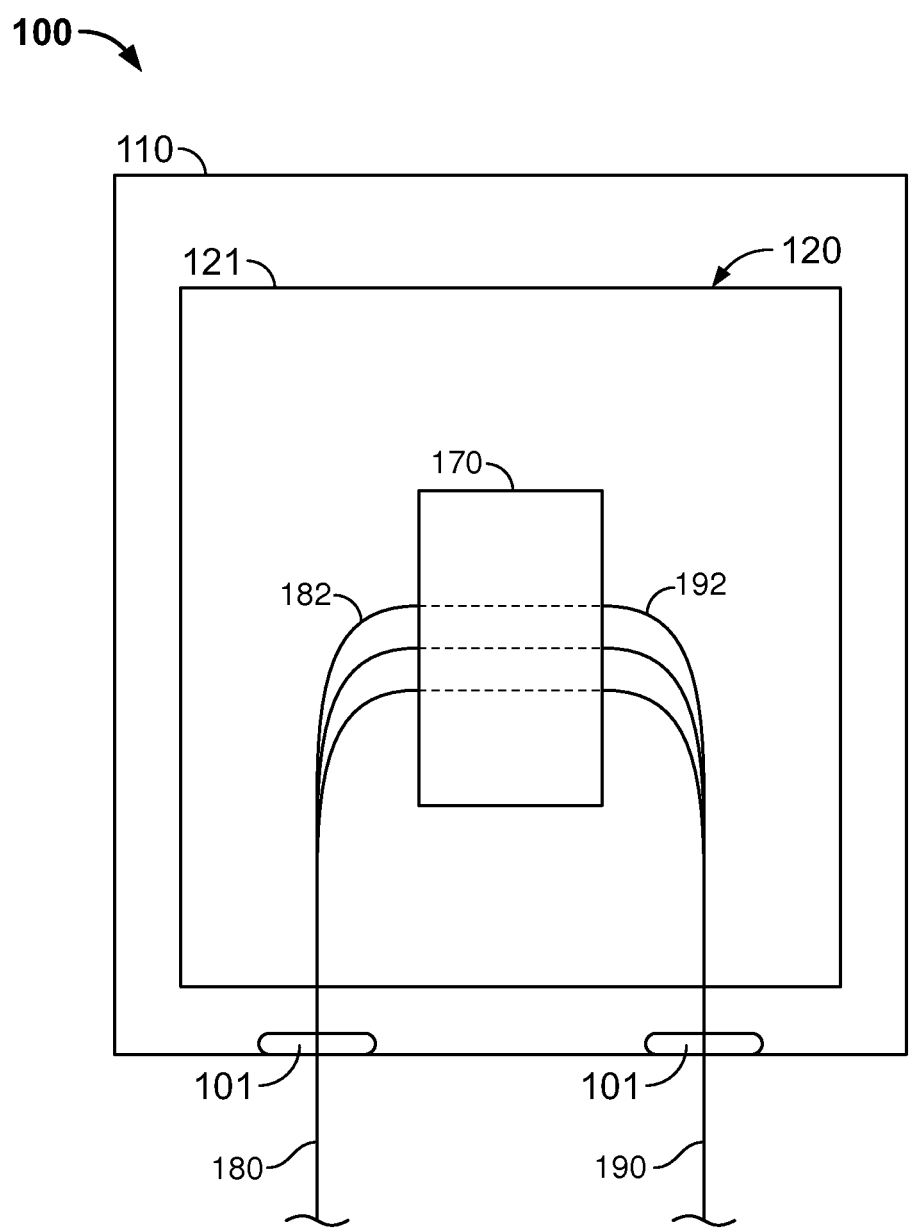
FIG. 1 is a schematic diagram of a fiber termination enclosure having an example mounting assembly disposed therein in accordance with the principles of the present disclosure.

FIG. 1 is a schematic diagram of an example fiber optic enclosure 100. The fiber optic enclosure 100 includes a housing, generally designated 110, at which telecommunications cables (e.g., optical and/or electrical cables) can be optically coupled and/or stored. One or more modular plate assemblies 120 may be mounted within the interior of the enclosure housing 110. Each modular plate assembly 120 includes a mounting plate 121 that is configured to mount to the enclosure housing 110 in a stationary configuration. Each modular plate assembly 120 includes a coupling arrangement 170 at which one or more optical fibers 182 of at least a first fiber cable 180 are optically coupled to optical fibers 192 of at least a second fiber cable 190. The fiber cables 180, 190 enter the enclosure housing 110 through cable ports 101.

In use, the enclosure housing 110 is deployed by securing the enclosure housing 110 to a mounting location (e.g., a wall, a pole, etc.). In some implementations, the enclosure housing 110 has brackets disposed on the top and bottom walls 111, 112. In other implementations, the enclosure housing 110 may have brackets disposed on other walls to secure the enclosure housing 110 to the mounting location. In still other implementations, the enclosure housing 110 is adapted to be otherwise secured to a mounting location.

Figure 3:
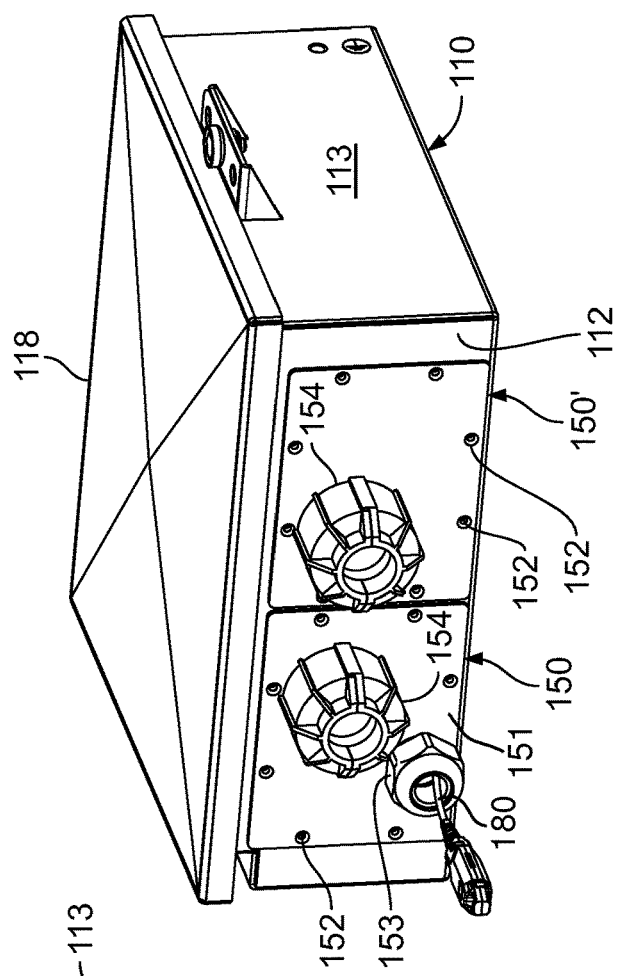
FIG. 3 is a front, bottom perspective view of the example fiber termination enclosure of FIG. 2 in which two cable port modules are visible.
Figure 2:
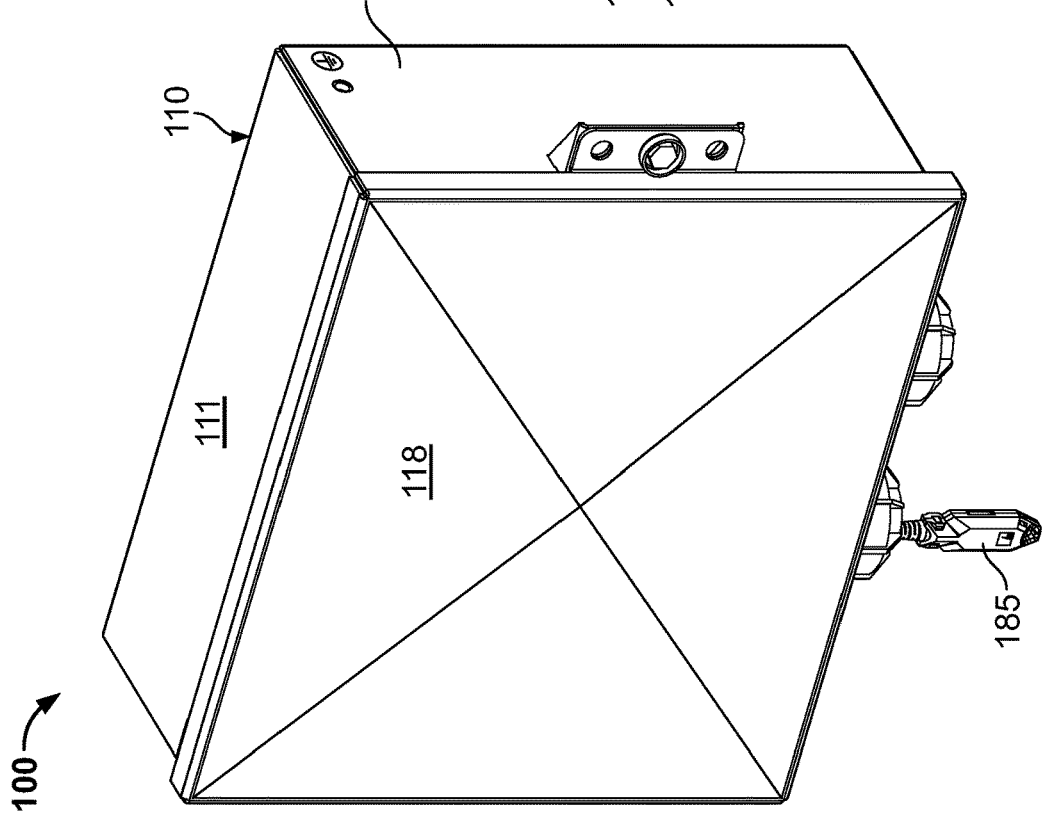
FIG. 2 is a front, top perspective view of an example fiber termination enclosure including an enclosure configured in accordance with the principles of the present disclosure and shown with a door in a closed position.
Figure 4:
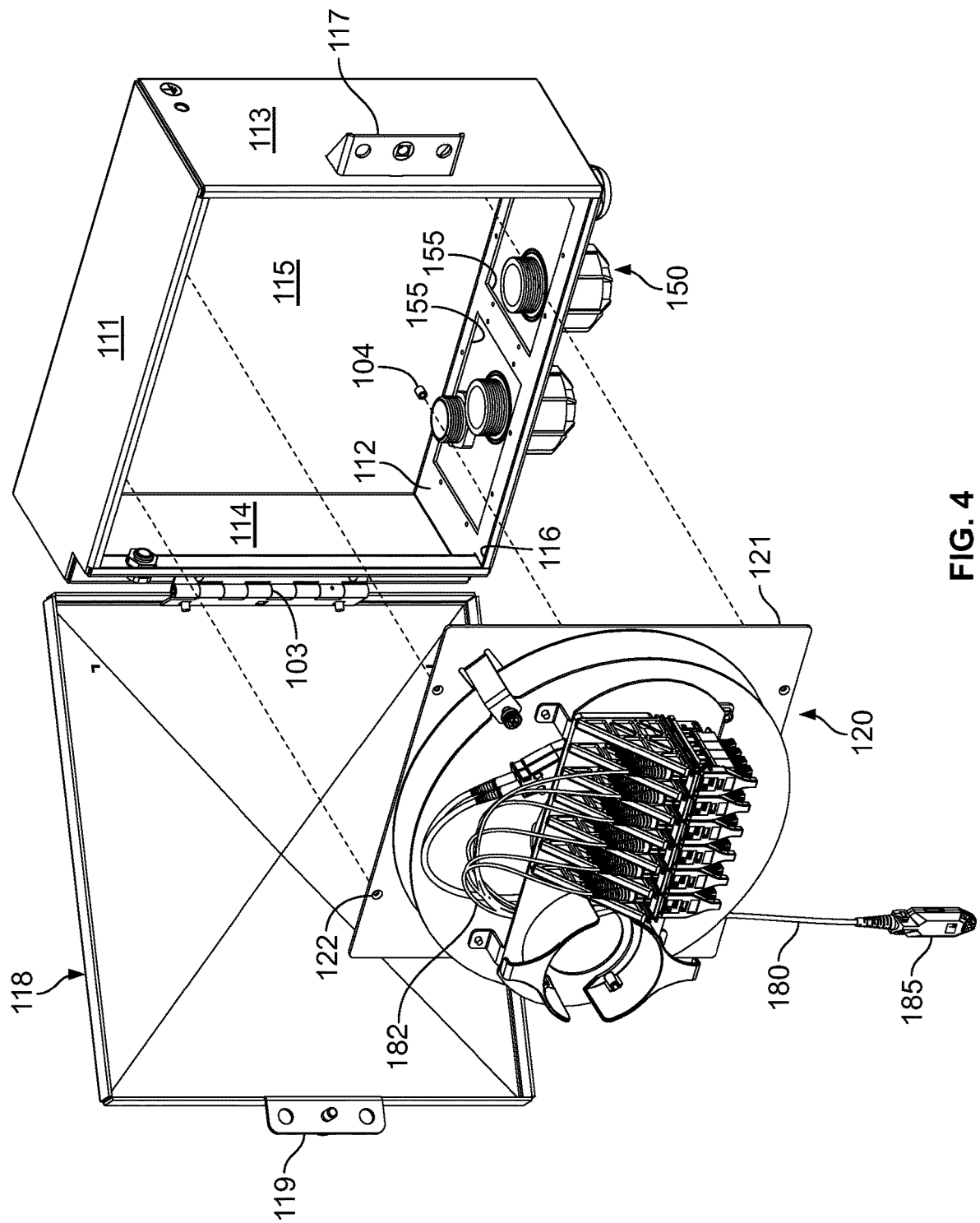
FIG. 4 is a front, top perspective view of the example fiber termination enclosure of FIG. 2 shown with the door in the open position and a cable spool mounting assembly exploded from the interior of the enclosure.

FIGS. 2-4 illustrate one example enclosure housing 110 having a top wall 111, a bottom wall 112 (FIG. 3), a first side wall 113, a second side wall 114 (FIG. 4), and a rear wall 115 (FIG. 4) defining an interior. The enclosure housing 110 also defines an open front 116 that provides access to the interior of the enclosure housing 110 (see FIG. 4). At least one cover 118 is coupled to the enclosure housing 110 to selectively close the open front 116 of the enclosure housing 110. The cover 118 is pivotally coupled to the enclosure housing 110 using one or more hinges 103 disposed on one of the side walls 113, 114 (see FIG. 4). The hinge 103 allows the cover 118 to selectively pivot between a closed position (shown in FIG. 2) and an open position (shown in FIG. 4). The cover 118 can be held closed using locking flanges 117, 119 (FIG. 4). In one implementation, the enclosure housing 110 is molded from a plastic material. In one implementation, the enclosure housing 110 is molded from a plastic material. In another implementation, the enclosure housing 110 is molded from a metal material.

In some implementations, the enclosure housing 110 defines one or more cable ports 101 (FIG. 1) at which cables 180, 190 may enter and exit the interior of the enclosure housing 110. In certain implementations, the cable ports 101 are disposed at the bottom wall 112 of the enclosure housing 110. In other implementations, however, the cable ports 101 may be disposed elsewhere on the enclosure housing 110, such as at the top wall 111, the rear wall 115, or one of the side walls 113, 114.

In some implementations, the enclosure housing 110 is configured to receive one or more cable port modules 150 at the cable ports 101 (e.g., see FIGS. 3 and 4). For example, the cable ports 101 may define openings 155 (FIG. 4) in one or more walls 111-115 of the enclosure housing 110 at which the cable port modules 150 may be received. Each cable port module 150 receives one or more cables 180, 190. In some implementations, a first cable port module 150 may receive one or more service cables and a second cable port module 150 may receive one or more subscriber cables. In other implementations, the same cable port module 150 may receive both service cables and subscriber cables. In still other implementations, the enclosure housing 110 may receive an even greater number of cable port modules 150, each of which may receive service cables and/or subscriber cables.

In certain implementations, a variety of cable port modules 150 may be configured to fit at the same opening 155, thereby enabling a user to select which of the cable port modules 150 to mount at the opening 155. In certain implementations, the cable port modules 150 may be removably mounted to the enclosure housing at the openings 155, thereby enabling a user to switch which cable port modules 150 are mounted at any particular enclosure housing 110.

Two example implementations of cable port modules 150, 150' are shown in FIGS. 3 and 4. Each of the cable port modules 150, 150' includes a port panel 151 configured to be mounted at an opening 155 defined in an enclosure housing 110. For example, the port panel 151 may define one or more openings 152 through which fasteners (e.g., screws, bolts, etc.) may extend to secure the port panel 151 to one of the walls 111-115 of the enclosure housing 110. One or more grommets extend through the port panel 151. Each grommet enables one or more cables 180, 190 or fibers to enter the enclosure housing 110 while inhibiting the ingress of environmental contaminants, such as water, dirt, and rodents.

A first example cable port module 150 includes a first type of grommet 153 and a second type of grommet 154. The second type of grommet 154 is larger than the first type of grommet 153. In the example shown, a cable 180 to be dispensed extends through the smaller grommet 153. A second example cable port module 150' includes only the second type of grommet 154 extending through the port panel 151. Other implementations may include still other types of cable port modules, each having its own configuration of grommets.

Referring to FIGS. 4-15, the mounting plates 121 of the modular plate assemblies 120 are adapted and configured to be mounted to the rear wall 115 of the enclosure housing 110. In some implementations, the rear wall 115 defines one or more openings through which fasteners may extend to secure a mounting plate 121 to the rear wall 115. In other implementations, the rear wall 115 may include one or more pegs over which the mounting plate 121 may be pressed. In other implementations, one or more panel fastening structures can be attached, secured, or mounted to the rear wall 115. In still other implementations, the rear wall 115 may include one or more pems 104 that are pressed into the rear wall 115 (see FIG. 4). The pems 104 are sized and configured to be inserted through openings 122 defined in the mounting plate 121. The pems 104 define threaded passages that are configured to receive fasteners that secure the mounting plate 121 to the rear wall 115, or can be exterior threaded shanks.

In accordance with some aspects, the mounting plates 121 of the modular plate assemblies 120 extend over a majority of the area of the rear wall 115. In some implementations, a mounting plate 121 has a rectangular shape (e.g., see FIG. 4). In other implementations, a mounting plate 121 may define one or more cutouts 129 or otherwise have a non-rectangular shape (e.g., see FIGS. 9-12). In accordance with other aspects, the mounting plates 121 of the modular plate assemblies 120 may extend over only a portion of the area of the rear wall 115. For example, some implementations, of the mounting plates 121 may be configured to extend over about half of the area of the rear wall 115 (e.g., see FIGS. 11-14).

Figure 5:
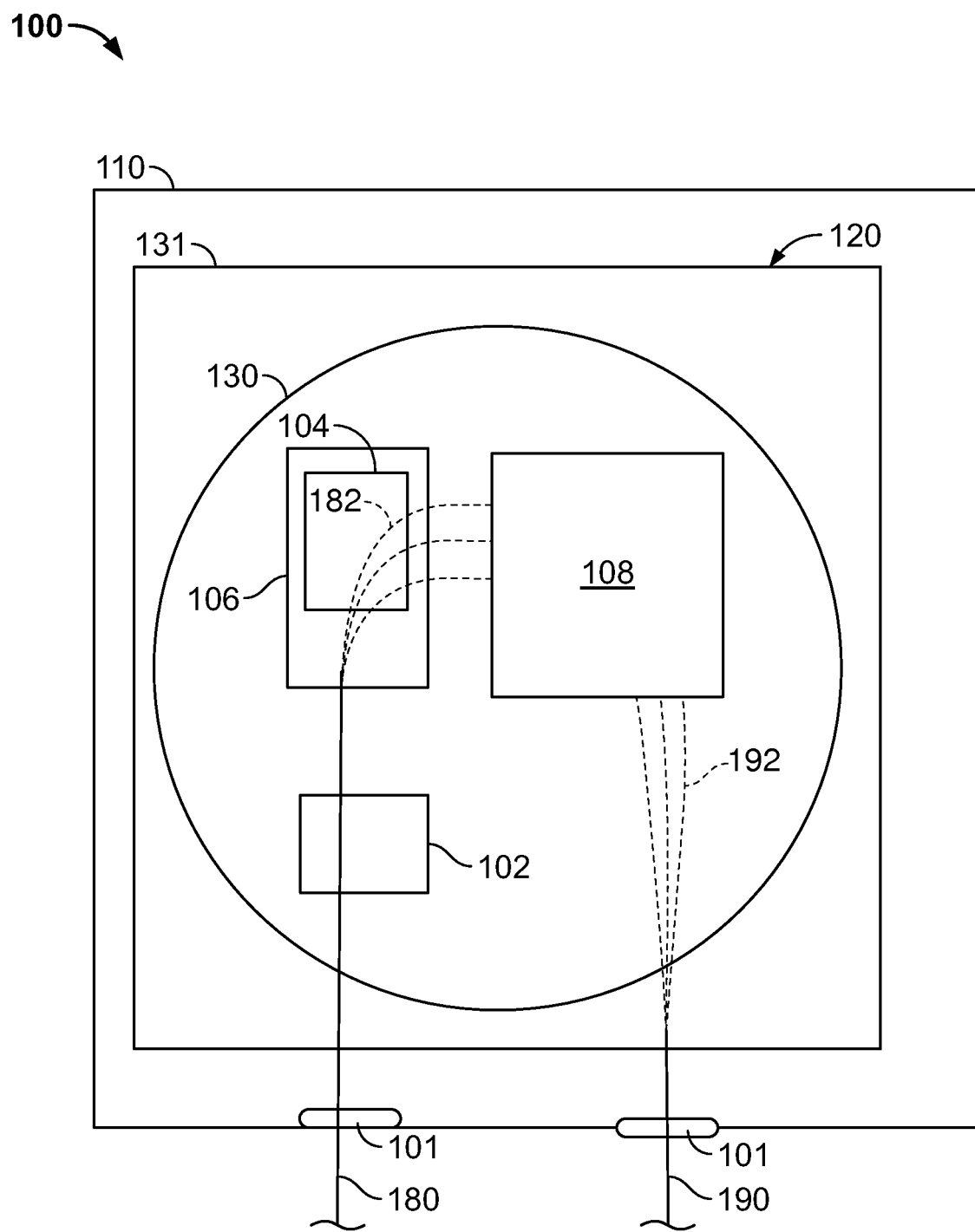
FIG. 5 is a schematic diagram of the fiber termination enclosure of FIG. 4 configured in accordance with the principles of the present disclosure.

FIGS. 4-7 illustrate a first implementation of a modular plate assembly 120 that includes a cable spool arrangement 130 (FIG. 6) that is rotationally mounted to the modular plate assembly 120. As shown in FIG. 5, the cable spool arrangement 130 includes a first storage area 102, a second storage area 104, and a termination region 108. In some implementations, the termination region 108 is spaced from the second storage area 104, which is spaced from the first storage area 102. In certain implementations, the termination region 108 is spaced forwardly of the second storage region 104, which is spaced forwardly of the first storage region 102 (e.g., see FIG. 4). In certain implementations, the second storage area 104 forms part of a protected fiber management region 106 at which optical fibers can be separated out from optical cables.

At least a first fiber cable (e.g., distribution cable) 180 and at least a second cable (e.g., subscriber cable) 190 enter the housing 110 through cable ports 101. Fibers 192 of the second fiber cable 190 are routed to the termination region 108. The first fiber cable 180 is routed to the first storage area 102 of the cable spool arrangement 130. From the first storage area 102, the first fiber cable 180 is routed to the second storage area 104. The first fiber cable 180 is broken out into individual optical fibers 182 at the protected fiber management region 106. The fibers 182 are routed to the termination region 108 at which the optical fibers 184 are connected to optical fibers 192 of the second fiber cable 190.

The fiber optic enclosure 100 provides an enclosure from which lengths of a cable (e.g., a distribution cable) 180 can be dispensed following the mounting of the fiber optic enclosure 100 to a mounting location. The distribution cable 180 is dispensed from the fiber optic enclosure 100 by pulling on an end (e.g., a connectorized end) 185 of the cable 180 (see FIGS. 4 and 7). As the distribution cable 180 is dispensed, the cable spool arrangement 130 rotates about an axis relative to the stationary mounting plate 121 of the fiber optic enclosure 100. In the event that there is a residual length of distribution cable 180 that is not dispensed during the cable payout, the fiber optic enclosure 100 can store this residual length.

Figure 6:
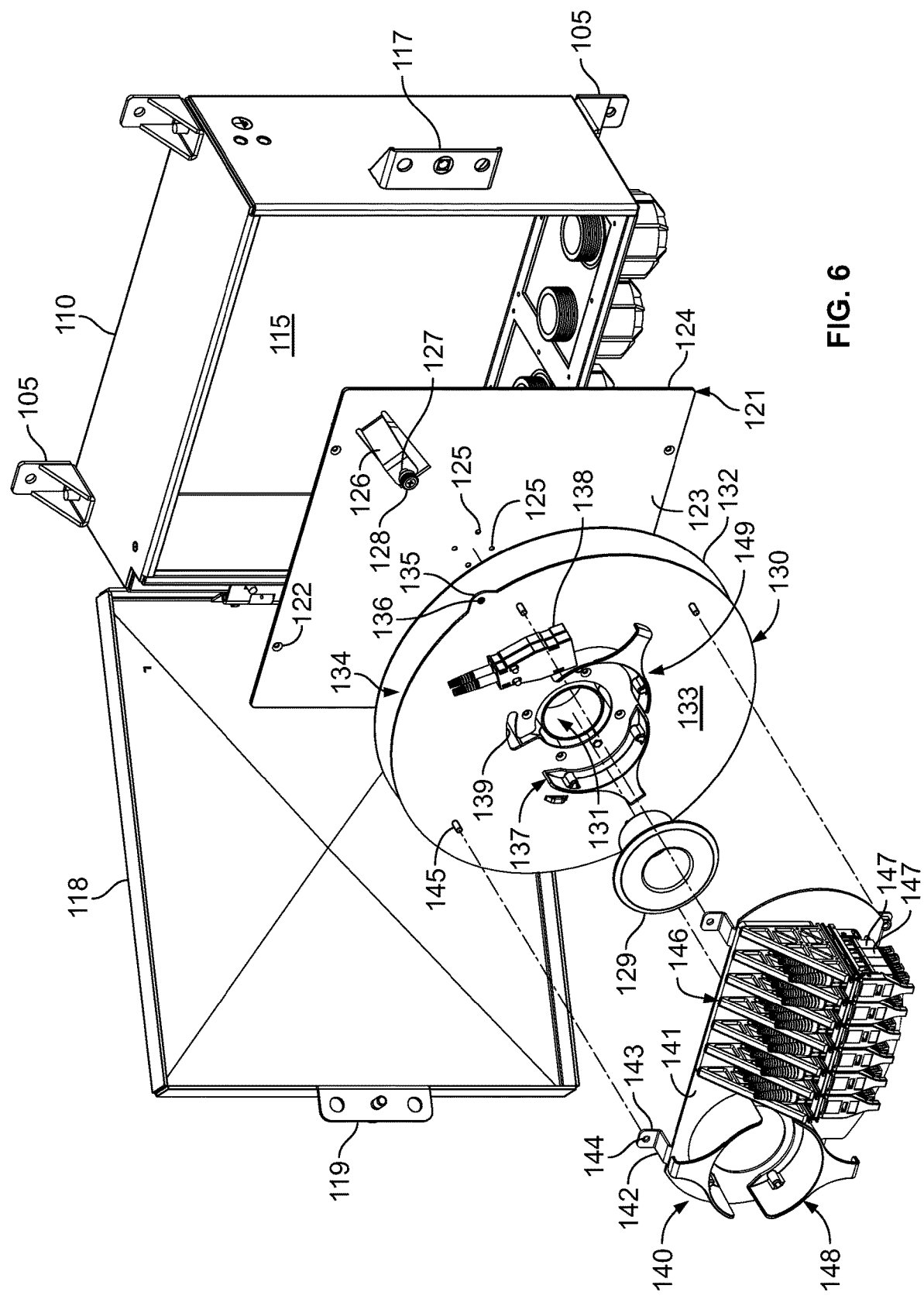
FIG. 6 is a front, top perspective view of the example fiber termination enclosure of FIG. 4 in which with the cable spool mounting assembly is exploded to show various example components of the cable spool mounting assembly including a mounting plate, a cable spool arrangement, and a stand-off mount element.
Figure 7:
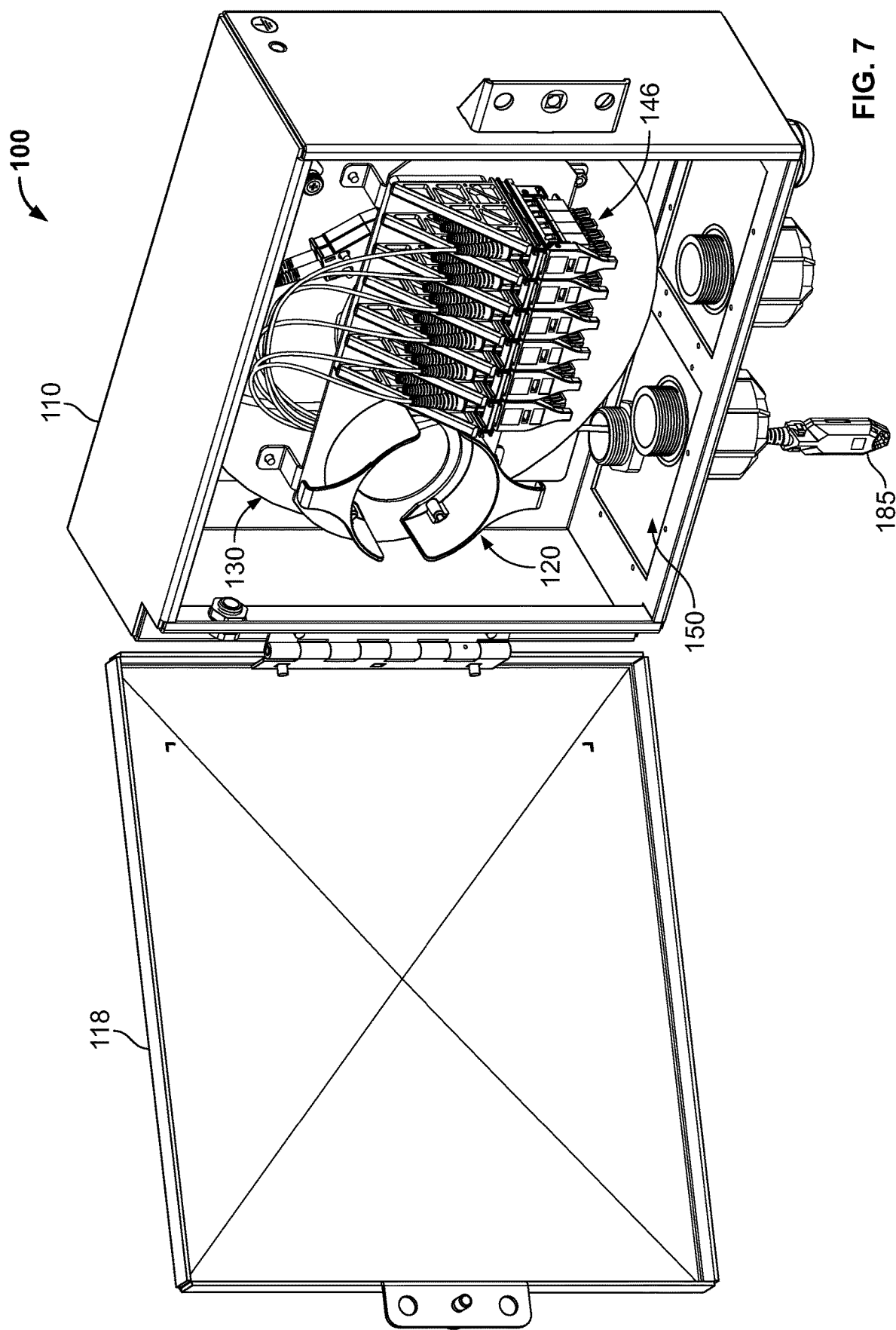
FIG. 7 is a front, top perspective view of the example fiber termination enclosure of FIG. 6 shown with the cable spool mounting assembly installed within the interior of the enclosure housing.

As shown in FIG. 6, the cable spool mounting assembly 120 includes a mounting plate 121 and a cable spool arrangement 130. The mounting plate 121 includes a first side 124 and an opposite second side 123. The mounting plate 121 is adapted for stationary mounting to the rear wall 115 of the housing enclosure. In certain implementations, the second side 123 of the mounting plate 121 is configured to be mounted to an interior surface of the rear wall 115 so that the mounting plate 121 is disposed within the interior of the housing enclosure 110. For example, in certain implementations, the mounting plate 121 defines one or more fastener openings 122 that are disposed to align with fastener openings provided on the rear wall 115 of the housing enclosure 110. Certain types of mounting plates 121 extend along substantially the entire rear wall 115 of the enclosure housing 110.

The cable spool arrangement 130 includes a drum 131 extending between first and second support flanges 132, 133 to form a first cable spool 134. The first cable spool 134 defines the first storage region 102 (FIG. 5). In some implementations, the cable spool arrangement 130 also includes a termination region 108 (FIG. 5). In certain implementations, a protected fiber management region 106 (FIG. 5) is defined between the first storage region 102 and the termination region 108. For example, in certain implementations, in FIG. 6, the cable spool arrangement 130 includes a stand-off mounting assembly 140, at which the termination region 108 (FIG. 5) is disposed as will be described in more detail herein. The protected fiber management region 106 (FIG. 5) is defined between the stand-off mounting assembly 140 and one of the first cable spool 134 (e.g., see FIG. 4).

In certain implementations, the drum portion 131 of the first cable spool 134 is generally cylindrical in shape. The drum portion 131 includes a first end portion that couples to the first support flange 132 and an oppositely disposed second end portion that couples to the second support flange 133. The support flanges 132, 133, which are generally parallel to each other, are configured to rotate with the drum 131. An outer surface of the drum 131 and inner surfaces of the support flanges 132, 133 define the first storage region 102 (FIG. 5) within which optical fibers or cables (e.g., distribution cable 180) may be coiled.

The drum portion 131 has a sufficient diameter to provide bend radius protection to optical fibers wound around the fiber spool 134. The drum portion 131 defines a central bore that extends through the drum portion 131. In the subject embodiment, the central bore is adapted to receive a spindle 129 (FIG. 6). In certain implementations, the spindle 129 extends through the bore in the drum 131 and secures to the second side 123 of the mounting plate 121. For example, in certain implementations, the mounting plate 121 defines openings 125 at which the spindle 129 is fastened to the mounting plate 121. The first cable spool 134 is configured to rotate about the spindle 129 relative to the mounting plate 121.

The support flanges 132, 133 are sized and shaped to retain the optical fibers wound around the drum 131 in the first storage region 102. In some implementations, the support flanges 132, 133 are generally circular. In certain implementations, the support flanges 132, 133 have a sufficient diameter to cover a majority of a surface area of the mounting plate 121. In other implementations, however, one or both of the support flanges 132, 133 may have a smaller diameter.

In some implementations, the cable spool arrangement 130 is configured to be releasably locked in a rotationally fixed position relative to the mounting plate 121. For example, in certain implementations, the mounting plate 121 includes a forwardly extending flange 126 that is configured to extend past the support flanges 132, 133 of the drum 131 to interact with the front of the cable spool arrangement 130 (see FIG. 6). The forwardly extending flange 126 defines an opening 127. The second flange 133 of the cable spool 134 defines an opening 136 that is disposed to align with the opening 127 of the forwardly extending flange 126 when the cable spool arrangement 130 is disposed in one rotational position. In certain implementations, the opening 136 is defined in a tab 135 that extends outwardly from the generally annular circumference of the second support flange 133. A fastener 128 may be inserted through the openings 136, 127 to lock the cable spool arrangement 130 in the rotationally fixed position.

In some implementations, the second support flange 133 of the cable spool 134 defines an aperture 139 through which optical fibers or cables (e.g., distribution cable 180) may pass between the first storage area 102 and the front of the cable spool 134. In certain implementations, the cables pass through aperture 139 from the first storage region 102 to the protected fiber management region 106. For example, in certain implementations, the aperture 139 is located directly adjacent to the protected fiber management region 106 and allows cables from inside the first storage region 102 of the spool to be routed from the drum surface 131 to the protected storage region 106.

The protected fiber management region 106 (FIG. 5) provides a mounting location for a fan out arrangement. The fan out arrangement includes one or more fan outs 138 disposed between the back side of the stand-off 140 and the front side of the cable spool 134 (see FIG. 4). For example, the fan outs 138 may be disposed on the front side of the second support flange 133 of the cable spool 134. Accordingly, the fan outs 138 rotate with the cable spool 134. The cable 180 wrapped around the supplemental spool region 104 can be routed to one of the fan outs 138 where individual optical fiber are broken out to form individual fiber optic pigtails 182. The pigtails 182 have ends connectorized by fiber optic connectors that are inserted into the fiber optic adapters 147 at the termination field 108 (see FIG. 4). Fiber optic connectors corresponding to fibers 192 of subscriber cables 190 also may be inserted into the adapters 147 to provide optical connections between the subscriber cables 190 and the cables 180 routed from the first cable spool 134.

The protected fiber management region 106 also can include bend radius protectors 137 attached to the front spool flange 133 (FIG. 6). The bend radius protector 137 can form a supplemental spooling region 104 where cables routed from drum 131 through aperture 139 can be wrapped/spooled to provide cable storage and cable management. The pigtails 182 also may be wrapped/spooled around the bend radius limiters 137. In some implementations, the supplemental spooling region 104 provides strain relief to the cables (e.g., distribution cables) 180. Axial loads applied to the outside end 185 of the cables 180 will be transferred through the cable 180 to the wrapped portions of the cable 180. However, the axial loads will not be transferred to the connectorized ends of the pigtails 182. Accordingly, pulling on the first cable end 185 will not detach the connectorized pigtails 182 from the adapters 147 at the termination region 108.

Still referring to FIGS. 4-7, a stand-off mount element 140 may be coupled to the front of the first cable spool 134. For example, the stand-off mount element 140 may be secured to the second support flange 133 of the first cable spool 134 so that the stand-off mount element 140 unitarily rotates with the first cable spool 134. The stand-off mount element 140 provides a front plate 141 where optical components (e.g., fiber optic adapters, splitters, splice trays, spools, bend radius protector, etc.) can be mounted. For example, fiber optic adapters 147 may form a termination region 108 on the front plate 141. Cable management structures (e.g., bend radius limiters, spools, etc.) 148 also may be provided on the stand-off plate 141. In the example shown, two opposing bend radius limiters 148 form a fiber spool on the stand-off plate 141.

In certain implementations, one or more legs 142 extend rearwardly from the stand-off plate 141 of the stand-off mount element 140. Each leg 142 defines an opening 143 configured to receive a peg 145 or fastener to secure the feet 143 to the front support flange 133 of the cable spool 134. In the example shown, the stand-off mount element 140 includes four legs 142. In other implementations, however, the stand-off mount element 140 may include greater or fewer legs 142. In still other implementations, the legs 142 may be unitary with the cable spool 134 and secure to the stand-off plate 141.

The stand-off plate 141 is forwardly offset from the front side of the spool flange 133, thereby forming the protected fiber management region 106 between the front side of the first cable spool 134 and back side of the stand-off mount element 140 (e.g., see FIG. 4). The separated fibers 184 in the protected fiber management region 106 are routed around the bend radius limiters 137 or other management structures on the front of the cable spool 134 to the stand-off mount element 140. In the example shown, the separated fibers 184 have connectorized ends that plug into first ports of termination adapters 147 disposed at the stand-off plate 141.

Components disposed on the stand-off mount element 140 are spaced forwardly of the cable spool 134. Accordingly, the fiber optic adapters 147 are disposed on a different layer or plane than the fan outs 138, which are disposed on a different layer or plane than the first cable spool 134. In certain implementations, the fan outs 138 are disposed on the same layer or plane as the bend radius limiters 137. The spacing between the cable spool layer and the stand-off layer enhances slack storage of optical fibers routed through the protected fiber management region 106. In some implementations, the spacing between the cable spool layer and the stand-off layer inhibits over-bending of the fibers when routed between the fan out arrangements 138 and the fiber optic adapters 147.

In certain implementations, the termination adapters 147 are included in one or more termination modules 146. In certain implementations, the adapter modules 146 are sliding adapter modules. Similar sliding adapter modules have been described in commonly owned U.S. Pat. Nos. 5,497,444; 5,717,810; 6,591,051; and 7,416,349, the disclosures of which are hereby incorporated by reference. In the example shown, the stand-off mount element 140 includes six sliding adapter modules 146, each holding four fiber optic adapters 147. In other implementations, the stand-off mount element 140 may include greater or fewer sliding adapter modules 146 holding greater or fewer termination adapters 147. In certain implementations, sufficient slack length of the separated fibers 182 is left between the fan out arrangement 138 and the adapters 147 to accommodate the sliding movement of the sliding adapter modules 146.

In some implementations, the cable spool arrangement 130 may be precabled at the factory or manufacturing center with one or more optical fibers or cables 180. For example, one or more multi-fiber cables 180 may be wound around the storage area 102 of the cable spool 134. In certain implementations, the multi-fiber cables 180 may be precabled to pass through the aperture 139 to the fan out arrangement 138 disposed in the protected fiber management region 106 (e.g., see FIGS. 4 and 7). The fan out arrangement 138 separates the cables 180 into pigtails 182. In certain implementations, the fan out arrangement 138 also upjackets the fibers 182. In other implementations, however, the cable spool arrangement 130 may be cabled with the one or more multi-fiber cables 180 after the enclosure housing 110 is deployed.

The precabled cable spool mounting assembly 120 is mounted within the enclosure housing 110. For example, the mounting plate 121 is secured to a rear wall 115 of the enclosure housing 110. When the mounting assembly 120 is installed in the enclosure housing 110, the second ends of the multi-fiber cables 180 may be routed through one of the cable ports so that the second ends are disposed outside of the enclosure housing 110. In some implementations, the second ends of the one or more precabled multi-fiber cables 180 may be terminated at one or more multi-fiber connectors 185. In other implementations, the second end of a precabled multi-fiber cable 180 is separated into two or more connectorized optical fibers (jacketed or unjacketed). In still other implementations, the second ends of the multi-fiber cables 180 are configured to be spliced to one or more optical fiber cables.

A user may pull on the second ends to dispense the stored length of cable 180 from the cable spool arrangement 130. For example, a user may pull a second end of a cable 180 to a fiber distribution hub, drop terminal, or other network connection. Because the adapters 147 rotate in unison with the cable spool arrangement 130, the second end of each multi-fiber cable 180 may be paid out without interfering with the cabling of the first ends of the multi-fiber cable 180. When the second ends 185 of the one or more multi-fiber cables 180 are each connected to the network, the fastener 128 may be inserted through aligned openings 135, 128 to secure the cable spool arrangement 130 in a fixed rotational position relative to the mounting plate 121.

When the cable spool arrangement 130 is secured in a rotationally fixed position, additional optical fiber cables may be routed into the enclosure housing 110 to secure to second ports of the termination adapters 147. For example, the additional optical fiber cables may be routed into the enclosure through one or more cable ports defined in the enclosure housing 110. The termination adapters 147 are configured to align and optically couple connectors terminating the additional optical cables with the connectorized ends of the multi-fiber cable 180 plugged into the first ports of the adapters 147.

Figure 8:
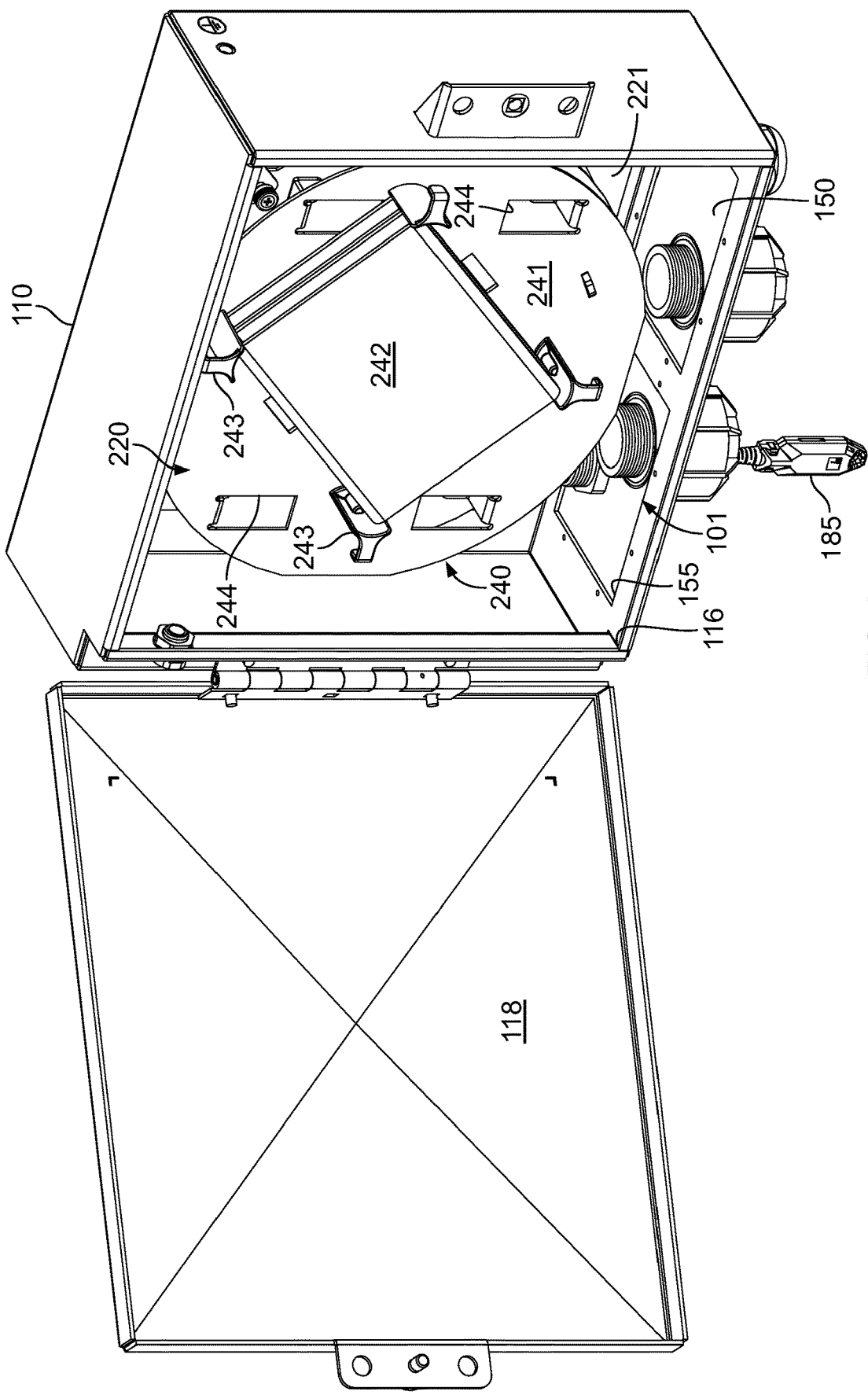
FIG. 8 is a front, top perspective view of the example fiber termination enclosure of FIG. 2 shown with an example splice tray reel mounting assembly installed within the interior of the enclosure housing.

FIG. 8 illustrates a second example modular plate assembly 220 implemented as a second example cable spool mounting assembly 120 for mounting within the enclosure housing 110. The second cable spool mounting assembly 220 includes a rectangular mounting plate 221 that extends over a majority of the rear wall 115. A cable spool arrangement 241 is disposed on the mounting plate 221 and is configured to rotate relative to the mounting plate 221 (e.g., about a spindle). Since the mounting plate 221 is configured to remain stationary on the rear wall 115, the cable spool arrangement 241 is configured to rotate relative to the enclosure housing 110.

The cable spool arrangement 241 defines a storage area including a drum about which optical fibers or cables (e.g. of a multi-fiber distribution cable 180) may be coiled. The drum has a sufficient diameter to provide bend radius protection to optical fibers wound around the fiber spool arrangement 241. Rotating the cable spool arrangement 241 dispenses or retracts the optical fibers or cables wound around the drum. In some implementations, the cable spool arrangement 241 may be locked in a rotational orientation relative to the mounting plate 221.

In certain implementations, one or more splice trays 242 are disposed on the cable spool arrangement 241. Each splice tray 242 is configured to optically couple together two or more optical fibers. For example, each splice tray 242 may optically couple together at least one optical fiber of the distribution cable 180 and at least one optical fiber of a subscriber cable 190 (FIG. 1). Certain types of splice tray 242 may be pivoted between open and closed positions to provide access to the splices contained therein. In certain implementations, the splice trays 242 are stacked upon each other so that a bottom of the stack extends over the cable spool arrangement 241 and a top of the stack faces the open front 116 of the enclosure housing 110.

One or more fiber management structures may be disposed on the cable spool arrangement 241. For example, in certain implementations, one or more bend radius limiters 243 are disposed on a front of the cable spool arrangement 241. In the example shown, four bend radius limiters are disposed at a top, bottom, and sides of the cable spool arrangement 241. The cable spool arrangement 241 also defines one or more channels 244 through which optical fibers or cables can pass between the storage area of the cable spool arrangement 241 and the splice trays 242. In the example shown, the cable spool arrangement 241 defines four openings 244 spaced between the bend radius limiters 243.

In some implementations, the second cable spool mounting assembly 220 may be precabled at the factory or manufacturing center with one or more distribution cables 180. The one or more distribution cables 180 may be wound around the drum in the storage area of the second cable spool arrangement 241. In certain implementations, the first end of each distribution cable fiber may be routed through one of the openings 244 in the cable spool arrangement 241, around one or more of the bend radius limiters 243, and into one of the splice trays 242 disposed at a front of the cable spool arrangement 241 (e.g., see FIG. 8).

The precabled second cable spool mounting assembly 220 is mounted within the enclosure housing 110 to deploy the one or more distribution cables 180. For example, the mounting plate 221 is secured to the rear wall 115 of the enclosure housing 110 as described above. The second ends 185 of the distribution cables 180 may be routed out of the housing 110 through one of the cable port modules 101 so that the second ends 185 are disposed outside of the enclosure housing 110 (e.g., see FIG. 8). Additional optical fiber cables (e.g., subscriber cables 190 of FIG. 1) may be routed into the enclosure housing 110 (e.g., through the same or other port modules 101). Unconnectorized ends of the subscriber cable fibers may be optically coupled to the first ends of the service cable fibers at the splice trays 242. For example, each subscriber cable fiber may be routed from the respective cable port module 101 to the respective splice tray 242 (e.g., either directly or after being wound around some of the bend radius limiters 243 of the second cable spool mounting assembly 220.

Figure 9:
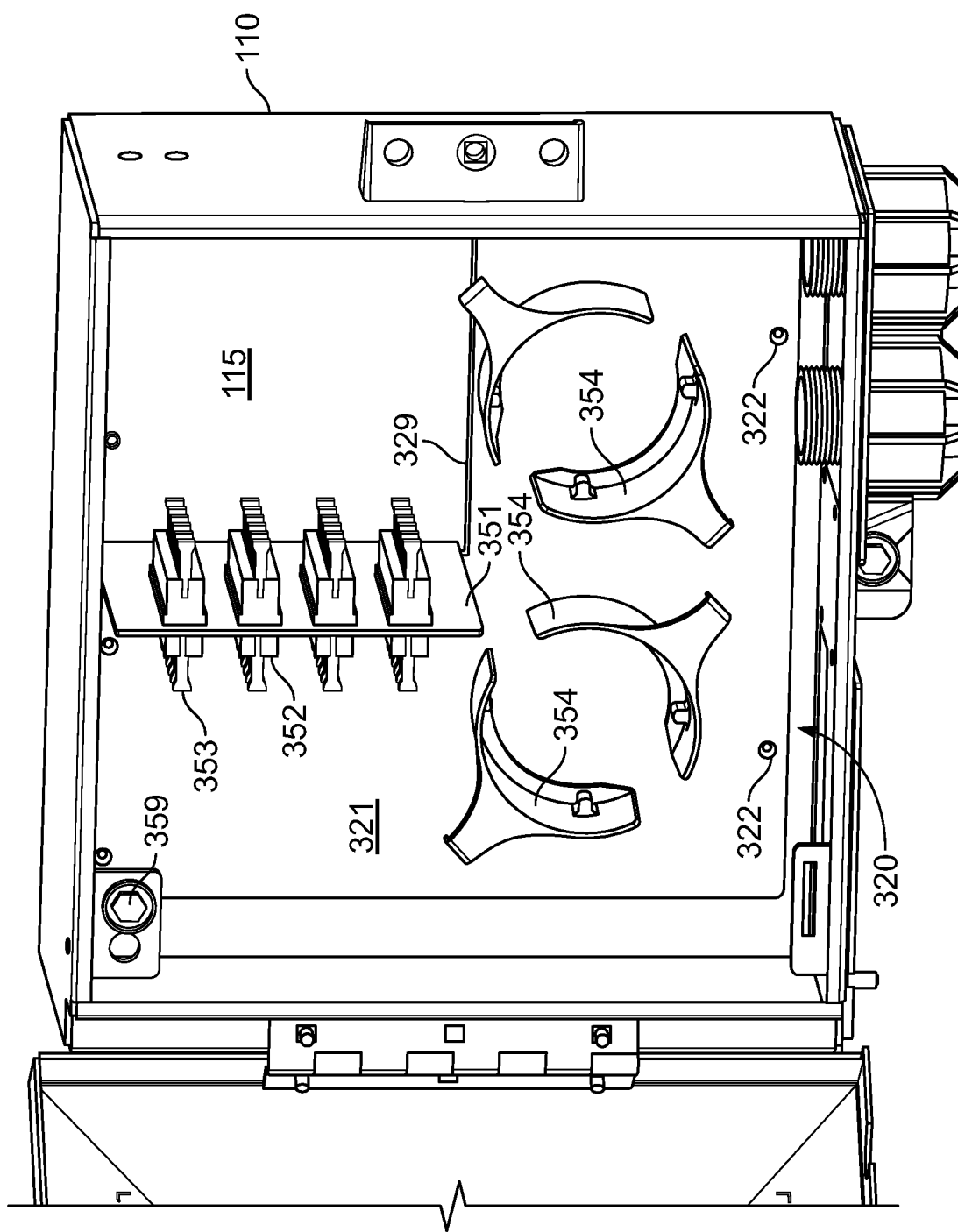
FIG. 9 is a front, top perspective view of the example fiber termination enclosure of FIG. 2 shown with an example termination panel mounting assembly installed within the interior of the enclosure housing.
Figure 10:
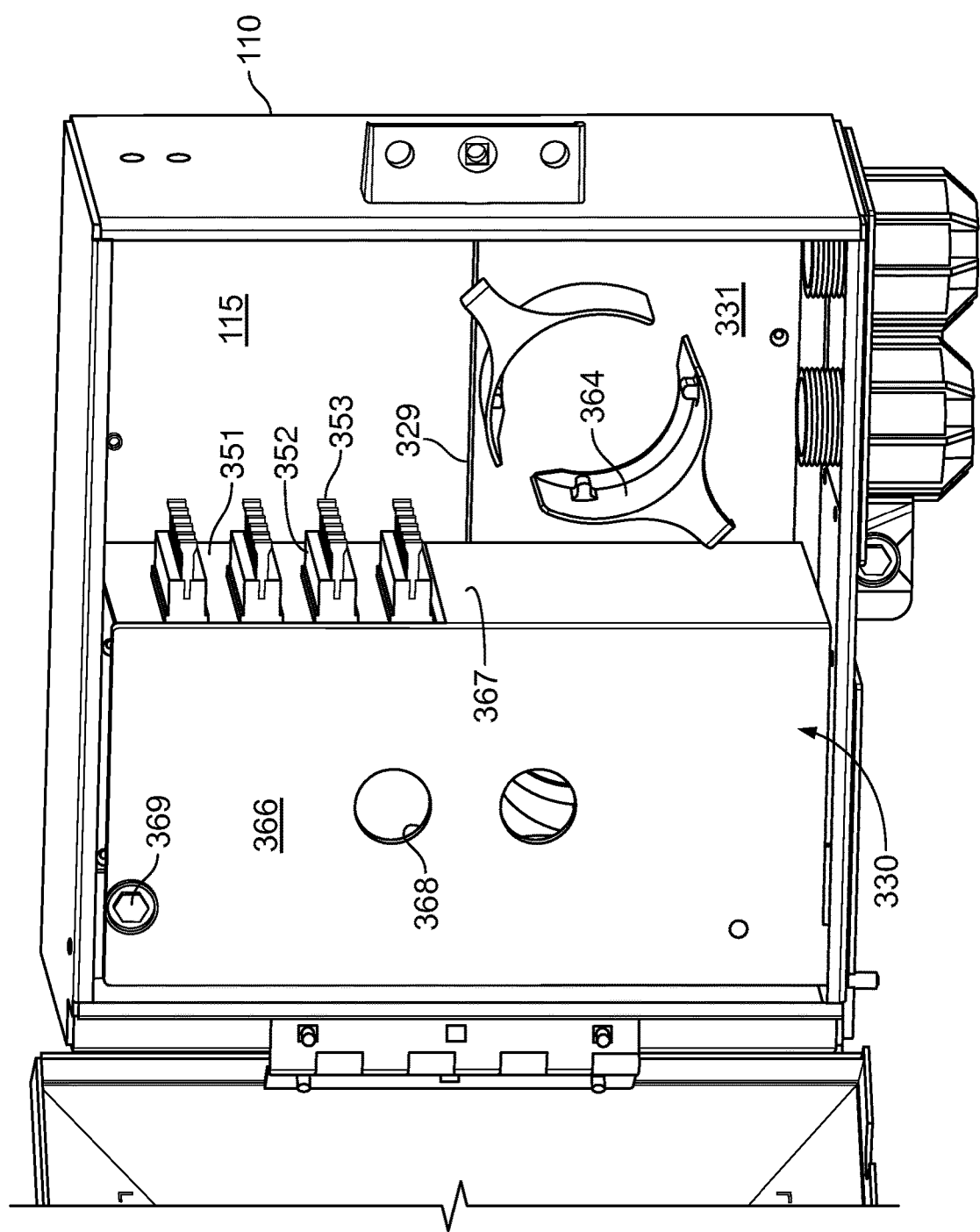
FIG. 10 is a front, top perspective view of the example fiber termination enclosure of FIG. 9 shown with an example cover disposed over the cable spool mounting assembly.

FIGS. 9 and 10 illustrate a third example modular plate assembly 120 implemented as a termination panel mounting assembly 320. The termination panel mounting assembly 320 includes a mounting plate 321 that is sized to extend over a majority of the rear wall 115 of the enclosure housing 110. In particular, the mounting plate 321 has a height that extends over a majority of a height of the rear wall 115 and the mounting plate 321 has a width that extends over a majority of a width of the rear wall 115. The mounting plate 321 defines one or more apertures 322 or pems that facilitate connection to the rear wall 115.

Certain types of mounting plates 321 define one or more cutouts 329. In the example shown in FIG. 9, the mounting plate 321 defines a cutout 329 at an upper, right corner of the mounting plate 321, thereby resulting in an L-shaped mounting panel 321. In other implementations, the mounting plate 321 may have other configurations.

A termination plate 351 is coupled to the mounting plate 321. In some implementations, the termination plate 351 is a bent portion of the mounting plate 321. In other implementations, the termination plate 351 is a separate piece that attaches to the mounting plate 321 (e.g., via snap-fit connection, latches, fasteners, etc.). In the example shown, the termination plate 351 extends vertically with a first side facing the first side wall 113 and a second side facing the second side wall 114 of the enclosure housing 110. In other implementations, the termination plate 351 has a first side that faces the rear wall 115 and a second side that faces the open front 116 of the enclosure housing 110.

One or more termination adapters 352 are disposed on the termination plate 351. Each termination adapter 352 has a first port and a second port. In the example shown, the first port faces the first side wall 113 and the second port faces the second side wall 114 of the enclosure housing 110. In other implementations, the adapter ports may face the rear wall 115 and open front 116 of the enclosure housing 110. In still other implementations, the adapters 352 and the termination plate 351 may be oriented at any desired angle relative to the mounting plate 321. In certain implementations, adapter dust caps 353 may be provided at the adapter ports.

In certain implementations, one or more cable management structures may be provided on the termination plate 351 or mounting plate 321. In the example shown, four bend radius limiters 354 are disposed on a front of the mounting plate 321. The bend radius limiters 354 are configured to form two fiber spools. In certain implementations, the bend radius limiters 354 form a first fiber spool located between the termination plate 351 and the first side wall 113 of the housing 110 and a second fiber spool located between the termination plate 351 and the second side wall 114 of the housing 110. In certain implementations, the bend radius limiters 354 are located substantially below the termination plate 351. In other implementations, the same or other types of cable management structures may be disposed in different configurations.

During deployment of the termination panel mounting assembly 350, one or more optical fiber cables (e.g., distribution cables 180) may be routed into the enclosure housing 110 (e.g., through one or more port modules 101). Connectorized ends of the distribution cables may be secured to the first ports of the termination adapters 352. Additional optical fiber cables (e.g., subscriber cables 190) also may be routed into the enclosure housing 110 (e.g., through the same or other port modules 101). Connectorized ends of the subscriber cables may be secured to the second ports of the termination adapters 352, which align and optically couple together the connectorized ends of the subscriber cables with the connectorized ends of the service cables.

In certain implementations, a cover 330 may be positioned within the enclosure housing 110 to enclose or otherwise inhibit access to at least a portion of the optical components location within the enclosure housing 110 (see FIG. 10). In some implementations, the cover 330 extends from one of the side walls 113, 114 to the termination plate 351 to block access to at least some of the fiber connectors plugged into one side of the termination adapters 352. In the example shown, the cover 330 extends from the second side wall 114 to the termination plate 351 to block access to any cables (e.g., service cables) entering the enclosure housing 110 through the left cable ports 101, while allowing access to the cables (e.g., subscriber cables) entering the enclosure housing 110 through the right cable ports 101. In other implementations, the cover 330 may extend across the entire termination panel mounting assembly 320.

In the example shown, the cover 330 includes a front plate 366 and a side plate 367 forming an L-shaped flange. The front plate 366 extends from the second side wall 114 of the enclosure to the termination plate 351, thereby covering the bend radius limiters 354 located to the left of the termination plate 351. The front plate 366 also blocks access to the second ports of the adapters 352 from the open front 116 of the enclosure housing 110. The side plate 367 extends downwardly from the termination plate 351 to inhibit access to the second side of the termination plate 351 from the right side of the enclosure housing interior. In other implementations, the cover 330 may include two side plates and be located at a central portion of the enclosure interior. In still other implementations, the cover 330 may include a planar panel that extends across the open front 116 of the enclosure housing 110.

In some implementations, the cover 330 defines one or more finger holes 368 by which the cover 330 may be installed and/or removed from the enclosure housing 110. For example, in one implementation, the front plate 366 of the cover 330 defines two finger holes 368. In other implementations, the cover 330 may include a handle or other structure to facilitate manipulation of the cover 330. In certain implementations, the cover 330 may be secured in place by a lock arrangement 369.

Figure 11:
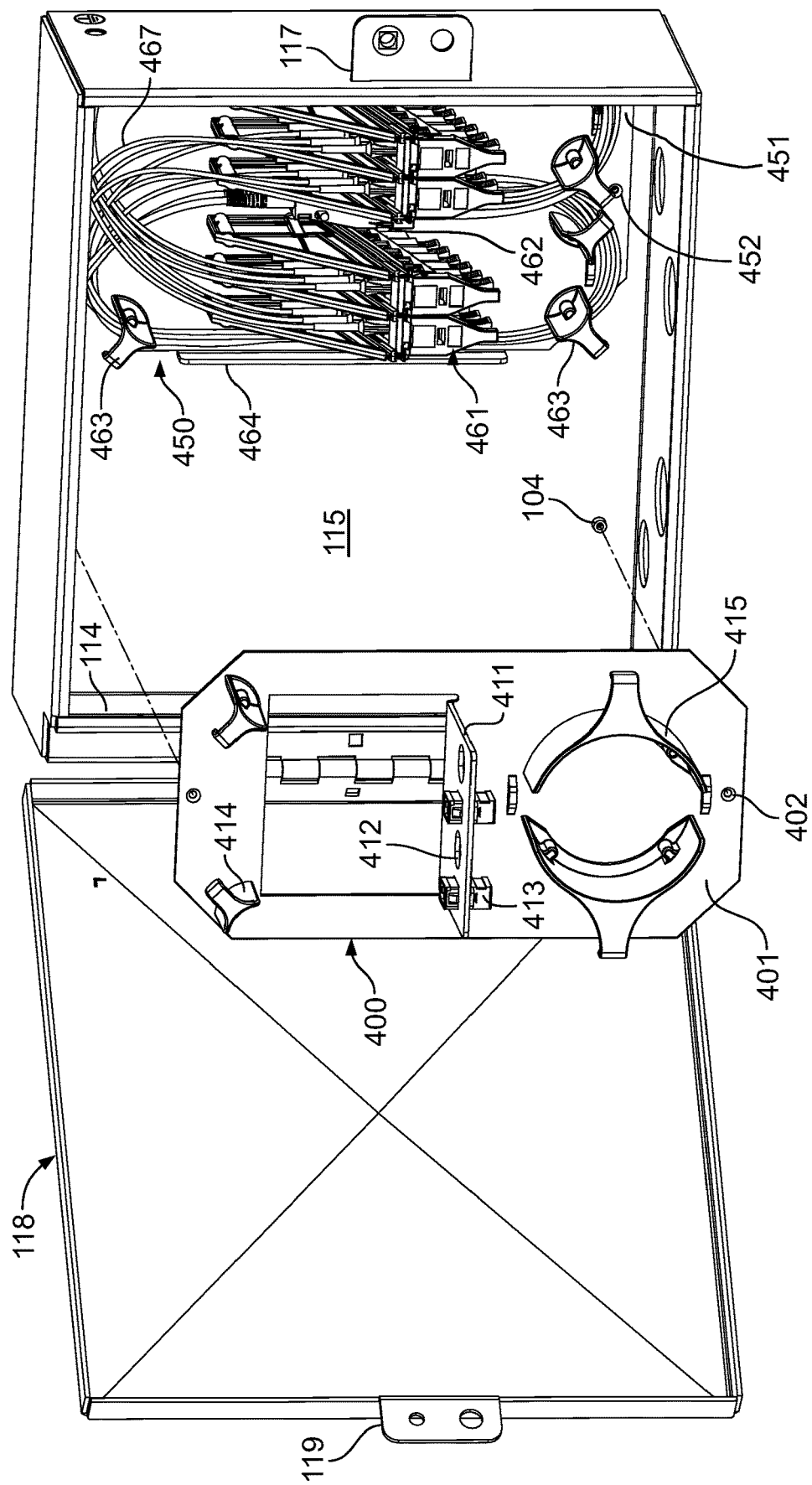
FIG. 11 is a front, top perspective view of the example fiber termination enclosure of FIG. 2 shown with the door in the open position, an example sliding adapter mounting assembly disposed within the interior of the enclosure, and an example drop-in plate mounting assembly exploded from the interior of the enclosure.
Figure 12:
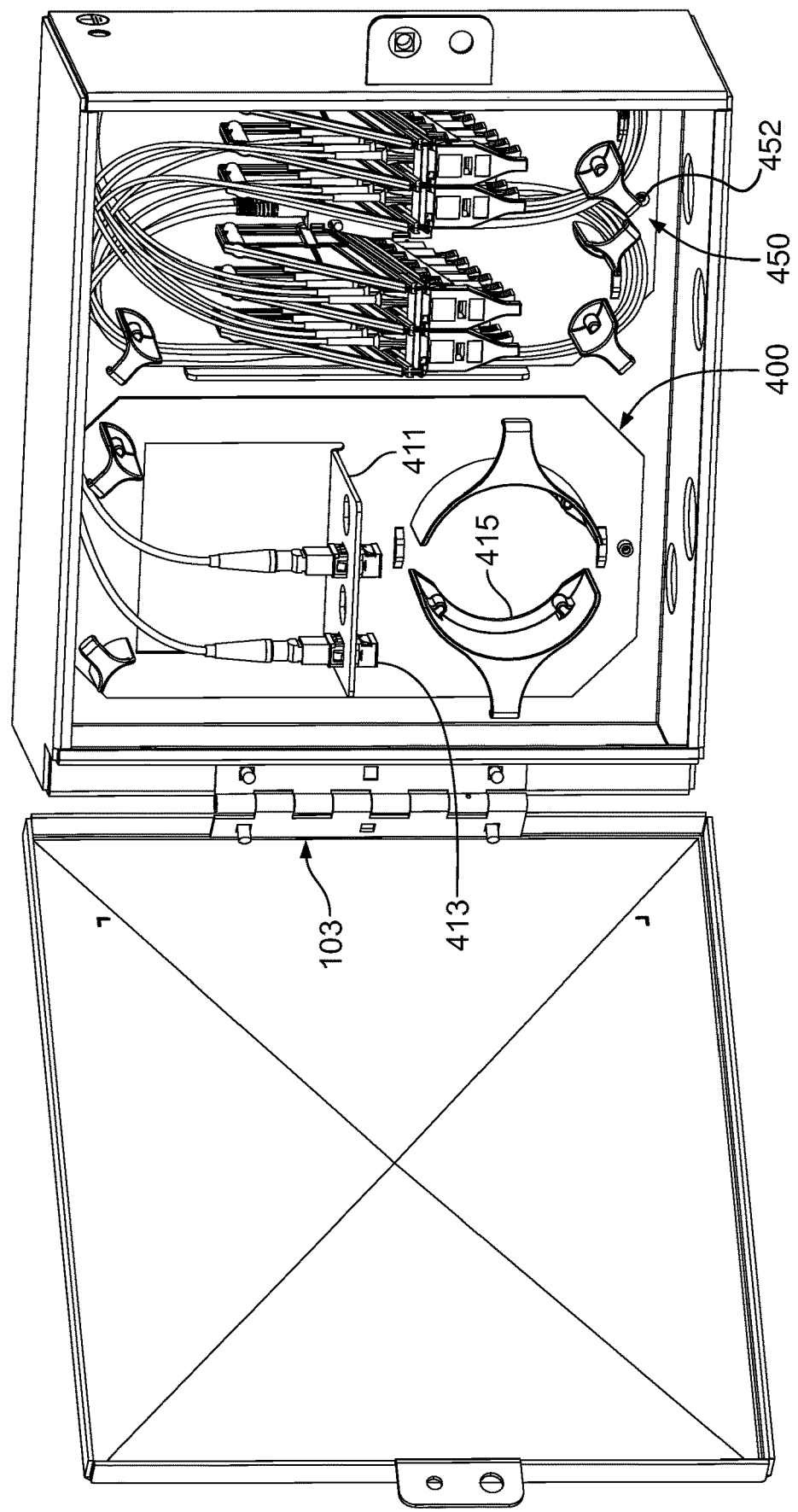
FIG. 12 is a front, top perspective view of the example fiber termination enclosure of FIG. 11 shown with the example drop-in plate mounting assembly disposed within the interior of the enclosure and partially cabled.
Figure 13:
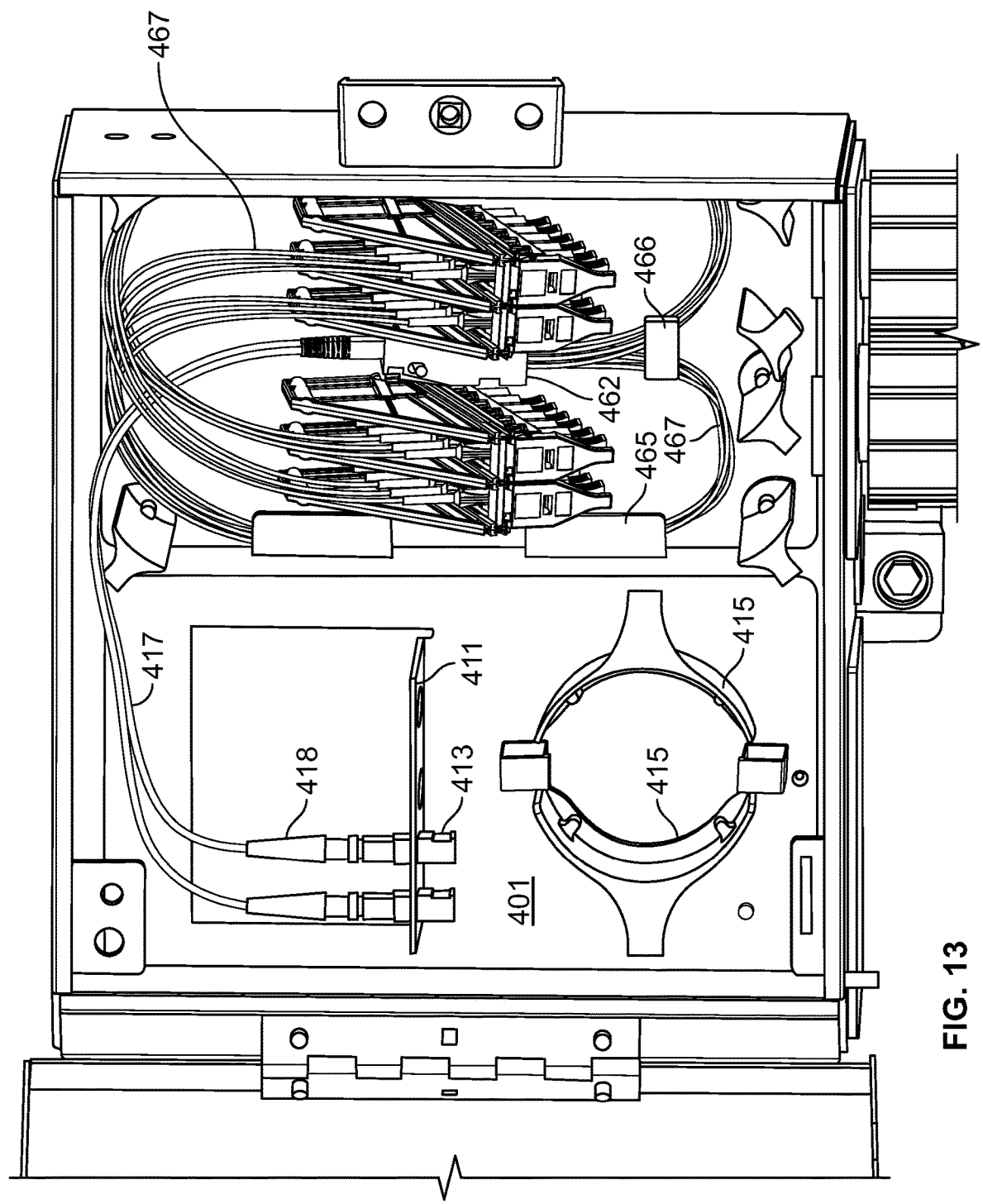
FIG. 13 is a front, top perspective view of the example fiber termination enclosure of FIG. 12 shown with cabling extending between the example drop-in plate mounting assembly and the example sliding adapter mounting assembly.

FIGS. 11-13 illustrate fourth and fifth example modular plate assemblies 120 implemented as an example drop-in plate mounting assembly 400 and an example sliding adapter mounting assembly 450, respectively. The fourth and fifth modular plate assemblies 400, 450 each extend over only a portion of the rear wall 115. For example, each of the fourth and fifth modular plate assemblies 400, 450 includes a mounting plate 401, 451 that has a height that extends substantially over a height of the rear wall 115 and a width that extends over less than half of the rear wall 115. In some implementations, the mounting plate 401, 451 is rectangular. In other implementations, the mounting plate 401, 451 is generally rectangular with notched corners. The mounting plate 401, 451 defines one or more apertures 402, 452 through which fasteners extend to secure the mount plate 401, 451 to the enclosure housing 110.

The drop-in plate assembly 400 includes a drop-in plate 411 defining one or more holes 412 at which adapters 413 may be secured. In some implementations, the drop-in plate 411 is formed from a bent portion of the mounting plate 401. In other implementations, the drop-in plate 411 is attached to the mounting plate 401. In some implementations, the drop-in plate 411 extends generally horizontally (i.e., parallel with the top wall 111 and bottom wall 112 of the enclosure housing 110). In other implementations, the drop-in plate 411 may be angled relative to the top and bottom walls 111, 112.

In certain implementations, the adapters 413 are snap-fit or press-fit into the holes 412 of the drop-in plate 411. In some implementations, the adapters 413 are configured to receive and align multi-fiber (MPO) connectors. A description of example MPO connectors can be found in U.S. Pat. No. 5,214,730, the disclosure of which is hereby incorporated herein by reference. In certain implementations, the adapters 413 are configured to receive and align hardened multi-fiber adapters (HMFOCs). A description of example HMFOCs can be found in U.S. Pat. No. 6,648,520, the disclosure of which is hereby incorporated herein by reference. In other implementations, the adapters 413 are configured to receive and align single optical connectors (e.g., LC-connectors, SC-connectors, ST-connectors, FC-connectors, etc.).

In certain implementations, the drop-in plate assembly 400 includes fiber management structures to facilitate routing optical fibers or cable between the adapters 413 and other components within the enclosure housing 110. For example, the drop-in plate assembly 400 may include bend radius limiters extending forwardly from the mounting plate 401. In the example shown, smaller bend radius limiters 414 are disposed above the drop-in plate 411 and larger bend radius limiters 415 are disposed below the drop-in plate 411. The larger bend radius limiters 415 form a slack storage spool.

The example sliding adapter mounting assembly 450 includes at least one sliding adapter module 461. Each sliding adapter module 461 includes a plurality of adapters that are slideably mounted to rails. In the example shown, each sliding adapter module 461 includes a row of six adapters. In the example shown, the example sliding adapter mounting assembly 450 includes a first group of two sliding adapter modules 461 spaced from another group of two sliding adapter modules 461. In other implementations, however, the example sliding adapter mounting assembly 450 may greater or fewer groups each having greater or fewer sliding adapter modules 461.

In some implementations, the sliding adapter modules 461 are configured to slide generally horizontally in a forward-rearward direction relative to the enclosure housing 110. In certain implementations, the sliding adapter modules 461 slide at an angle (e.g., at least partially in an upward-downward direction). In the example shown, the adapter modules 461 are oriented so that ports of the adapter modules 461 face towards the upper and lower walls 111, 112 of the enclosure housing 110. In other implementations, the adapter modules 461 may be oriented to face the side walls 113, 114 of the enclosure housing 110.

As noted above, additional details pertaining to example sliding adapter modules are provided in commonly owned U.S. Pat. Nos. 5,497,444; 5,717,810; 6,591,051; and 7,416,349, the disclosures of which are incorporated above.

The example sliding adapter mounting assembly 450 also includes a fanout arrangement 462 including one or more fanouts. Each fanout separates optical fibers from a multi-fiber cable. In the example shown, the fanout arrangement 462 is disposed between the two groups of adapter modules 461. In other implementations, the fanout arrangement 462 may be disposed elsewhere on the mounting panel 401. In certain implementations, two or more fanouts are stacked together so that a bottom of the stack abuts the mounting panel 401 and a top of the stack faces the open front 116 of the enclosure housing 110.

The example sliding adapter mounting assembly 450 also includes fiber management structures to facilitate routing optical fibers or cables from the sliding adapter modules 461 to other components within the enclosure housing 110. In certain implementations, the sliding adapter mounting assembly 450 may include one or more bend radius limiters 463 (FIG. 11). In the example shown, each group of adapter modules 461 has two corresponding bend radius limiters 463 at a bottom of the mounting panel 401 and at least one bend radius limiter 463 at a top of the mounting panel 451.

In certain implementations, the mounting panel 451 also may include guide flanges 464 (FIG. 11) that facilitates retaining optical fibers or cables within the area of the mounting panel 451. In some implementations, the mounting panel 451 defines a guide flange 464 on each side of the mounting panel 451. In the example shown in FIG. 11, each guide flange 464 is bent forwardly from the mounting panel 451. In other implementations, each guide flange 464 may be a separately attached piece. In the example shown, each guide flange 464 extends vertically to inhibit the fibers from spilling into the rest of the enclosure interior.

In the example shown in FIG. 13, the mounting panel 451 includes retaining flanges 465 defining a guide channel through which one or more fibers or cables may be routed. The retaining flanges 465 include a first portion extending forwardly of the mounting plate and a second portion that extends across the fibers disposed in the channel. For example, each retaining flange 465 may have an L-shaped cross-section. The mounting panel 451 of FIG. 13 also includes another type of guide flange 466 is T-shaped. The guide flange 466 is disposed between the two groups of sliding adapter modules 461.

In some implementations, the sliding adapter mounting assembly 450 may be precabled at the factory or manufacturing center with one or more intermediate fibers 467. Some example intermediate fibers 467 each include a single optical fiber. First ends of the intermediate fibers 467 are connectorized and plugged into first ports of the sliding adapter modules 461. Second ends of the intermediate fibers 467 are joined at a fanout arrangement 462 to form one or more multi-fiber cables 417. In certain implementations, the second ends of the multi-fiber cables 417 are connectorized (e.g., see optical connectors 418 of FIG. 13). In other implementations, the second ends of the multi-fiber cables 417 are unconnectorized.

The separate intermediate fibers 467 are routed around from the sliding adapter modules 461 and around the fiber management structures (e.g., bend radius limiters 463 and/or any of flanges 464-466). In certain implementations, sufficient slack length of the separated fibers 467 is left between the fanout arrangement 462 and the adapter modules 461 to accommodate the sliding movement of the sliding adapter modules 461. In other implementations, however, the sliding adapter mounting assembly 450 may be cabled after the enclosure housing 110 is deployed. As shown in FIG. 13, the connectors 418 terminating the multi-fiber cables 417 may be plugged into the first ports of the adapters 418 of the drop-in plate assembly 400 when both the drop-in plate assembly 400 and the sliding adapter mounting assembly 450 are disposed within the enclosure housing 110.

A first set of additional optical fiber cables (e.g., distribution cables 180) may be routed into the enclosure housing 110 (e.g., through one or more ports 101). Connectorized ends of the first set of optical fiber cables 180 may be plugged into the second ports of the adapters 413 at the drop-in plate assembly 400. A second set of additional optical fiber cables (e.g., subscriber cables 190) may be routed into the enclosure housing 110 (e.g., through the same or other port modules 101). Connectorized ends of the second set of optical fiber cables 190 may be secured to second ports of the sliding adapter modules 461. Accordingly, optical signals carried by the first group of optical fibers 182 may be passed to the multi-fiber cables 417 via the drop-in adapters 413 and then to the second group of optical fibers 192 via the sliding adapter modules 461.

Figure 14:
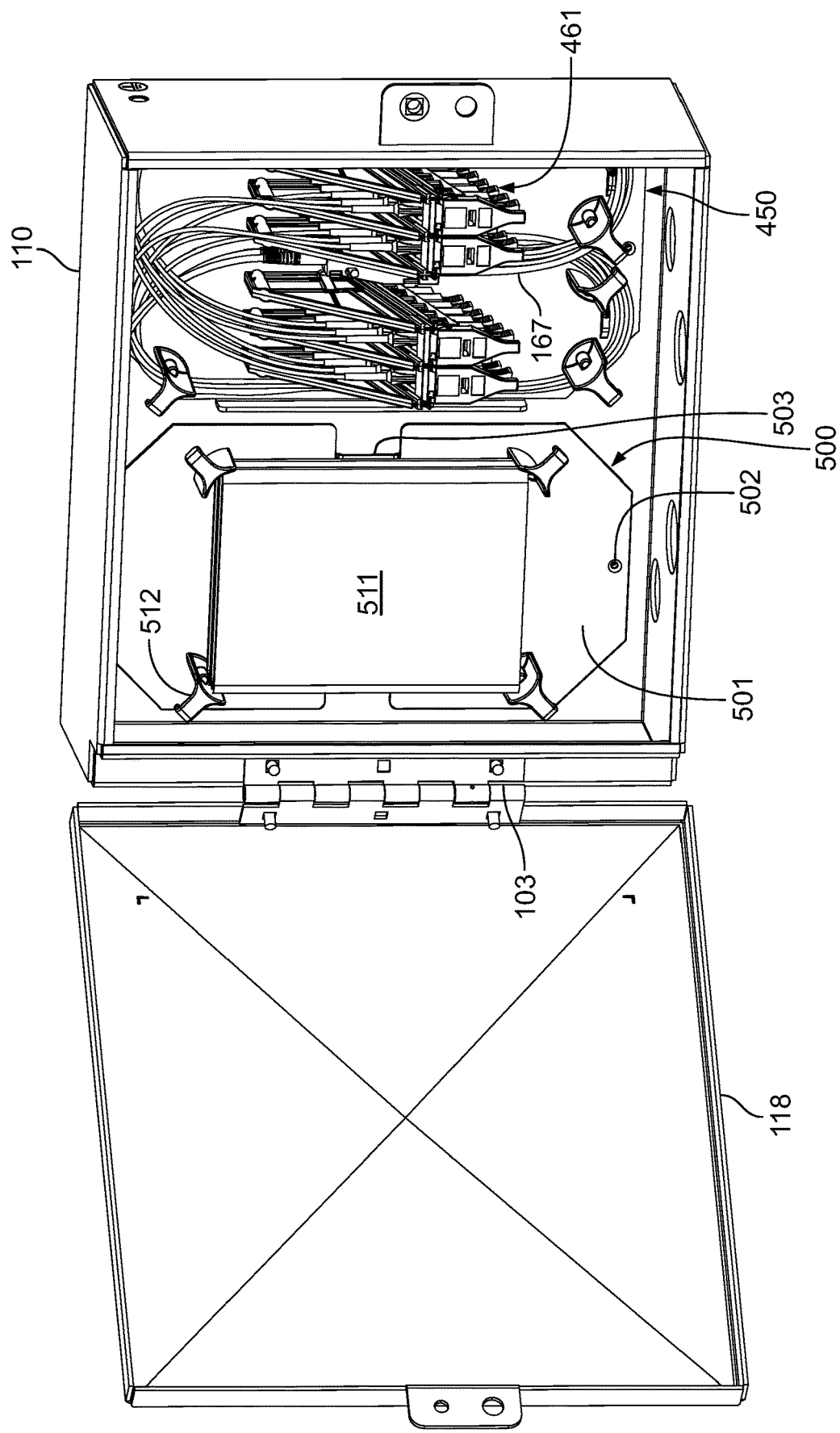
FIG. 14 is a front, top perspective view of the example fiber termination enclosure of FIG. 2 shown with an example splice tray mounting assembly and an example sliding adapter mounting assembly disposed within the interior of the enclosure housing.

FIG. 14 illustrates a sixth example modular plate assemblies 120 implemented as an example splice tray mounting assembly 500. In the example shown, the splice tray mounting assembly 500 extends over only a portion of the rear wall 115. For example, the splice tray mounting assembly 500 includes a mounting plate 501 that has a height that extends substantially over a height of the rear wall 115 and a width that extends over less than half of the rear wall 115. In some implementations, the mounting plate 501 is rectangular. In other implementations, the mounting plate 501 is generally rectangular with notched corners. In still other implementations, the mounting plate 501 has notched sides. The mounting plate 501 defines one or more apertures 502 through which fasteners extend to secure the mount plate 501 to the enclosure housing 110.

In certain implementations, one or more splice trays 511 are disposed on the mounting plate 501. Each splice tray 511 is configured to optically couple together two or more optical fibers. For example, each splice tray 511 may optically couple together at least one optical fiber of a service cable and at least one optical fiber of a subscriber cable or an intermediate fiber. Certain types of splice trays 511 may be pivoted between open and closed positions to provide access to the splices contained therein. In certain implementations, the splice trays 511 are stacked upon each other so that a bottom of the stack extends over the mounting plate 501 and a top of the stack faces the open front 116 of the enclosure housing 110.

One or more support members 503 may aid in securing the splice tray 511 to the mounting plate 501. In FIG. 14, a support member 503 is illustrated as at least one flange bent forwardly from the mounting late 501 at one side of the splice tray 511. One or more fiber management structures may be disposed on the mounting plate 501 about the splice tray arrangement 511. For example, in certain implementations, one or more bend radius limiters 512 are disposed on a front of the mounting plate 501. In the example shown, four bend radius limiters 512 are disposed at four corners of the splice tray arrangement 511. In other implementations, greater or fewer bend radius limiters 512 may be disposed in other configurations.

When the splice tray mounting assembly 500 is installed within the interior of the enclosure housing 110, two or more optical fibers may be spliced at the splice trays 511. In some implementations, one or more optical fiber cables (e.g., service cables) may be routed into the enclosure housing 110 through one or more modular cable ports 101. One or more additional optical fiber cables (e.g., subscriber cables) also may be routed into the enclosure housing 110 through the same or other modular cable ports 101. In some implementations, unconnectorized ends of both groups of optical fiber cables are coupled together at the splice trays 511.

In other implementations, the splice tray mounting assembly 500 is disposed within the enclosure housing 110 with the sliding adapter mounting assembly 450. In such implementations, the splice trays 511 are configured to optically couple together unconnectorized ends of a first group of optical fibers (e.g., from one or more service cables) to unconnectorized ends of intermediate fibers 467 plugged into the sliding adapter modules 461 of the sliding adapter mounting assembly 450.

Figure 15:
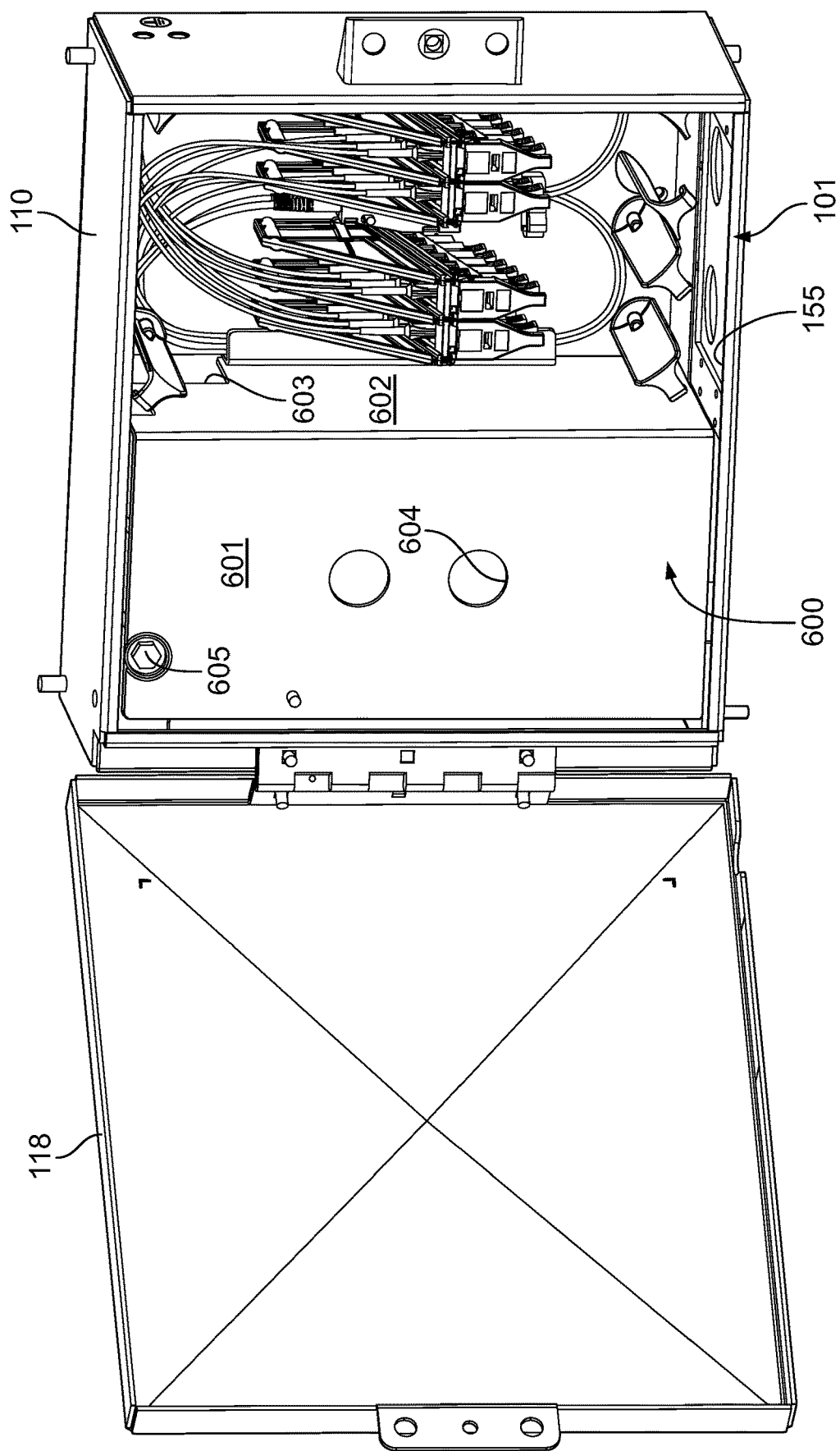
FIG. 15 is a front, top perspective view of the example fiber termination enclosure of FIG. 14 shown with an example cover disposed over the splice tray mounting assembly.

As shown in FIG. 15, an example cover 600 may be positioned within the enclosure housing 110 to enclose or otherwise inhibit access to at least a portion of the optical components location within the enclosure housing 110. In some implementations, the cover 600 extends from one of the side walls 113, 114 to an intermediate portion of the enclosure interior to block access to at least some of the fiber optical connectors disposed within the enclosure interior. In the example shown, the cover 600 extends from the second side wall 114 to cover the drop-in mounting assembly 400. Accordingly, the cover 600 blocks access to the drop-in adapters 413 and to any fiber optic connectors plugged into the drop-in adapters 413. In other implementations, the cover 600 may extend across both the drop-in mounting assembly 400 and the sliding adapter module assembly 450. In still other implementations, the cover 600 may extend across the splice tray mounting assembly 500.

In the example shown, the cover 600 includes a front plate 601 and a side plate 602 forming a generally L-shaped flange. The front plate 601 extends from one side of the mounting plate 401 of the drop-in mounting assembly 400 (or plate 501 of splice tray assembly 500) to the opposite side of the mounting plate 401. The front plate 601 also extends a majority of the distance between the top wall 111 and the bottom wall 112. The side plate 602 extends from the front plate 601 to the rear wall 115 of the enclosure housing 110. In certain implementations, the side plate 602 defines an opening, cutout, or other routing channel 603 through which optical fibers may be routed between the interior spaced enclosed by the cover 600 and the interior space accessible through the open front 116 of the enclosure housing 110. In other implementations, the cover 600 may include two side plates and be located at a central portion of the enclosure interior. In still other implementations, the cover 600 may include a planar panel that extends across the open front 116 of the enclosure housing 110.

In some implementations, the cover 600 defines one or more finger holes 604 by which the cover 600 may be installed and/or removed from the enclosure housing 110. For example, in one implementation, the front panel 601 of the cover 600 defines two finger holes 604. In other implementations, the cover 600 may include a handle or other structure to facilitate manipulation of the cover 600. In certain implementations, the cover 600 may be secured in place by a lock arrangement 605.

Figure 16:
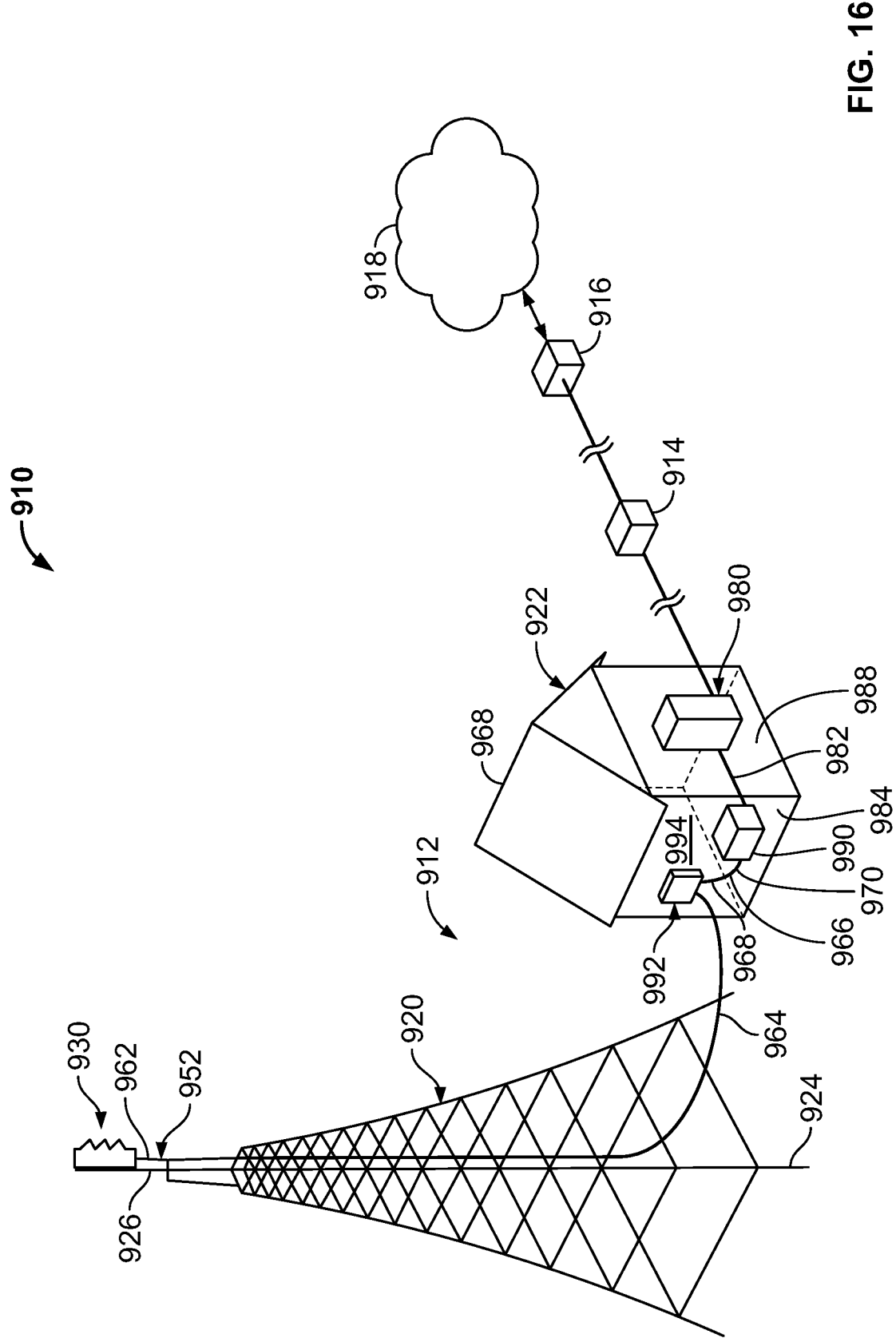
FIG. 16 is a schematic representation of a telecommunications network having exemplary features of aspects in accordance with the principles of the present disclosure.

In some implementations, implementations of the fiber termination enclosure 100 disclosed above may be used in cell site applications. For example, certain implementations 992 of the fiber termination enclosure 100 may be mounted to a top of a cellular tower or in a hut at a base of a cellular tower. FIG. 16 is a schematic representation of one example telecommunications network 910 utilizing such a cell site application. In the depicted embodiment, the telecommunications network 910 is a cellular network 910. The cellular network 910 includes a cell site 912, a demarcation point 914, a backhaul 916 and a core network 918.

The cell site 912 creates an area of telecommunications coverage (i.e., a cell) in the cellular network 910. In one embodiment, the cell site 912 includes a tower or mast 920 and a hut 922 that is in communication with the tower 920. In another embodiment, the cell site 912 includes a hut 922 that is in communication with an antenna or a plurality of antenna. The tower 920 includes a base portion 924 and an oppositely disposed top portion 926. In the depicted embodiment, the base portion 924 is rigidly fixed at a mounting location. In one embodiment, the top portion 926 of the tower 920 may include an antenna. The remote transceiver 928 may be integrated into the antenna.

The top portion 926 includes a remote transceiver 928 (e.g., a remote radio head). The remote transceiver 928 is adapted to transmit and receive signals to and from devices (e.g., mobile phones, smart-phones, devices with wireless internet connectivity, etc.) of subscribers to the cellular network 910. In certain implementations, the top portion 926 of the tower 920 includes multiple remote transceivers. In certain implementations, some of the remote transceivers are backup remote transceivers. The top portion 926 of the tower 920 further includes a multi-service terminal 930. Terminal that are suitable for use as the multi-service terminal 930 of the present disclosure have been described in U.S. Pat. Nos. 7,292,763 and 7,512,304, the disclosures of which are hereby incorporated by reference in their entirety.

The fiber optic cable 952 from the multi-service terminal 930 is routed to an enclosure 992 at the hut 922. The fiber optic cable 952 includes a first end 962 and an oppositely disposed second end 964. The first end 962 includes a plurality of connectors that are engaged to the inner ports of the fiber optic adapters of the multi-service terminal 930. The second end 964 includes a multi-fiber connector that is adapted for engagement to one of the first and second multi-fiber connectors of the enclosure 992.

A jumper cable 966 provides communication between the enclosure 992 and the base transceiver station 990. The jumper cable 966 includes a first end 968 and an oppositely disposed second end 970. The first end 968 is connected to the enclosure 992 while the second end 970 is connected to the base transceiver station 990. In one embodiment, the first end 968 includes a plurality of connectors that are engaged with the second side 924 of the fiber optic adapters 920 of the enclosure 992. In one embodiment, the second end 970 of the jumper cable 966 includes a multi-fiber connector that is engaged to the base transceiver station 990. In another embodiment, the second end 970 includes a plurality of connectors that is engaged to the base transceiver station 990.

The base transceiver station 990 is in communication with a telecommunications equipment rack 980 through a multi-fiber patch cable 982. The telecommunications equipment rack 980 is disposed in the hut 922. In one embodiment, the telecommunications equipment rack 980 includes any one or more of a power distribution unit, a fiber distribution unit, a transport switch, a mobile router, a media converter, an Ethernet panel, a DSX panel, protection and a battery. The telecommunications equipment rack 980 is in communication with the demarcation point 914. The demarcation point 914 is in communication with the backhaul 916, which is in communication with the core network 918.

Further details on such a telecommunications network 910 may be found in U.S. patent application Ser. No. 13/087,022, filed Apr. 14, 2011, and titled "Fiber to the Antenna," the disclosure of which is hereby incorporated herein by reference.

In other implementations, the fiber termination enclosure disclosed above may be used with other applications. For example, some fiber termination enclosures may be installed at facilities, such as multiple dwelling units, apartments, condominiums, businesses, etc., to provide a subscriber access point to the fiber optic network. Other fiber termination enclosures may be installed on towers located on top of high rise buildings or other tall structures. Various implementations of fiber termination enclosures may be installed at walls, H-frame racks, and poles.

Having described the preferred aspects and implementations of the present disclosure, modifications and equivalents of the disclosed concepts may readily occur to one skilled in the art. For example, one or more pass-through connections may be provided with any of the above-described types of modular plate assemblies 120. However, it is intended that such modifications and equivalents be included within the scope of the claims which are appended hereto.

The invention claimed is:

1. A fiber optic enclosure comprising:
    a base including a top wall, a bottom wall, and opposite sidewalls extending forwardly from a rear wall to an open front of the base to define an interior of the base, the bottom wall defining a plurality of cable ports;
    a cover that selectively mounts to the base over the open front;
    an insert mounted to the rear wall so that the insert is disposed within the interior of the base, the insert sized to be received within the interior of the base through the open front of the base, the insert including a mounting plate that couples to the rear wall of the base, the mounting plate extending parallel with the rear wall, the insert also including a support plate that extends forwardly of the mounting plate at a fixed position relative to the rear wall, the support plate defining an aperture sized to receive an optical adapter, the aperture facing the bottom wall; and
    a plurality of fiber management members carried by the mounting plate, the fiber management members including a first management member disposed within a first region extending between the support plate and the top wall of the base and a second management member disposed within a second region extending between the support plate and the bottom wall of the base.

2. The fiber optic enclosure of claim 1, further comprising an optical adapter mounted to the support plate of the insert at the aperture, the optical adapter defining oppositely facing first and second ports, the support plate orienting the adapter so that the first port faces towards the bottom wall of the base and the second port faces towards the top wall of the based.

3. The fiber optic enclosure of claim 1, wherein the first management member is a first bend radius limiter.

4. The fiber optic enclosure of claim 3, wherein the first bend radius limiter is one of a plurality of bend radius limiters in the first region.

5. The fiber optic enclosure of claim 3, wherein the second management member is a second bend radius limiter.

6. The fiber optic enclosure of claim 5, wherein the second bend radius limiter is one of a plurality of bend radius limiters in the second region.

7. The fiber optic enclosure of claim 1, wherein the mounting plate has a height that extends over a majority of a height of the rear wall, the height of the rear wall extending between the top wall and the bottom wall.

8. The fiber optic enclosure of claim 7, wherein the mounting plate has a width that extends over less than half of a width of the rear wall.

9. The fiber optic enclosure of claim 1, wherein the mounting plate has a width that extends over less than half a width of of the rear wall.

10. The fiber optic enclosure of claim 1, wherein the support plate extends parallel with the bottom wall of the base.

11. The fiber optic enclosure of claim 1, wherein the cover is configured to pivot relative to the base between an open position and a closed position, the cover providing access to the open front of the base when in the open position, the cover extending across the open front of the base when in the closed position.

12. The fiber optic enclosure of claim 11, wherein the cover includes a locking flange that aligns with a corresponding locking flange of the base when the cover is disposed in the closed position.

13. The fiber optic enclosure of claim 1, wherein the optical adapter is disposed between some of the fiber management members.

14. The fiber optic enclosure of claim 1, wherein the optical adapter snaps into the support plate.

15. The fiber optic enclosure of claim 1, wherein the optical adapter press fits into the support plate.

16. The fiber optic enclosure of claim 1, wherein the optical adapter is configured to receive and align single-fiber connectors.

17. The fiber optic enclosure of claim 1, wherein the optical adapter is configured to receive and align multi-fiber connectors.

18. The fiber optic enclosure of claim 1, wherein the rear wall defines a plurality of openings to facilitate securing the mounting plate of the insert to the rear wall.

19. The fiber optic enclosure of claim 18, further comprising a plurality of fasteners that extend through the rear wall of the base and through the mounting plate of the insert to couple the insert to the rear wall.

* * * * *